(12) United States Patent
Beshai

(10) Patent No.: US 6,996,559 B1
(45) Date of Patent: Feb. 7, 2006

(54) IP ADDRESS RESOLUTION METHODS AND APPARATUS

(75) Inventor: Maged E. Beshai, Stittsville (CA)

(73) Assignee: Nortel Networks Limited, Ottawa (CA)

( * ) Notice: Subject to any disclaimer, the term of this patent is extended or adjusted under 35 U.S.C. 154(b) by 0 days.

(21) Appl. No.: 09/471,244

(22) Filed: Dec. 23, 1999

(51) Int. Cl.
*G06F 17/30* (2006.01)

(52) U.S. Cl. .......................................... 707/6; 709/238
(58) Field of Classification Search ..... 707/100–104.1, 707/1–10; 709/238–244
See application file for complete search history.

(56) References Cited

U.S. PATENT DOCUMENTS

| 5,414,704 A | 5/1995 | Spinney ........................ 370/60 |
| 5,425,028 A | 6/1995 | Britton et al. .............. 370/94.1 |
| 5,796,944 A | 8/1998 | Hill et al. ................. 395/200.8 |
| 5,812,767 A | 9/1998 | Desai et al. ............. 395/200.8 |

FOREIGN PATENT DOCUMENTS

WO    WO99/14906    3/1999

OTHER PUBLICATIONS

Lampson et al. ("IP Lookups using Multiway and Multicolumn Search", 1998, IEEE, pp. 1248-1256).*
Knox et al. ("Parallel Searching Techniques for Routing Table Lookup", 1993, IEEE, pp. 1400-1405).*
IEEE Infocom, 1998, Gupta et al, p. 1240-1247.
A Fast IP Routing Lookup Scheme for Gigabit Switching Routers—Nen-Fu Huang, et al, pp. 1429-1436.
IP Lookups using Multiway and Multicolumn Search—Butler Lampson, et al., pp. 1248-1256.
Paralle Searching Techniques for Routing Table Lookup—D. Knox, et al., pp. 1400-1405.

* cited by examiner

*Primary Examiner*—Jean M. Corrielus
*Assistant Examiner*—Joon Hwan Hwang
(74) *Attorney, Agent, or Firm*—Ridout & Maybee LLP

(57) ABSTRACT

The expanding IP data networks require address resolution mechanisms that are fast and able to handle a vast number of addresses. Novel fast address resolution mechanisms with a large address directory are described. The address resolution mechanisms make use of a compound indexing-searching technique to increase the speed and capacity of a translation apparatus. Further embodiments employ partial address scrambling to balance the loads of parallel search units.

19 Claims, 23 Drawing Sheets

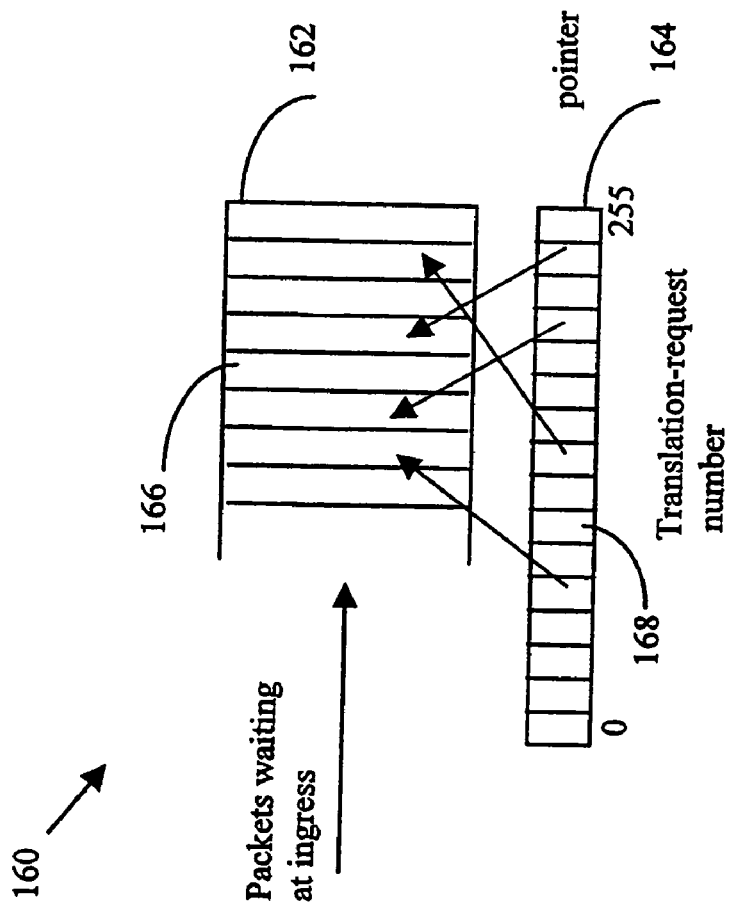

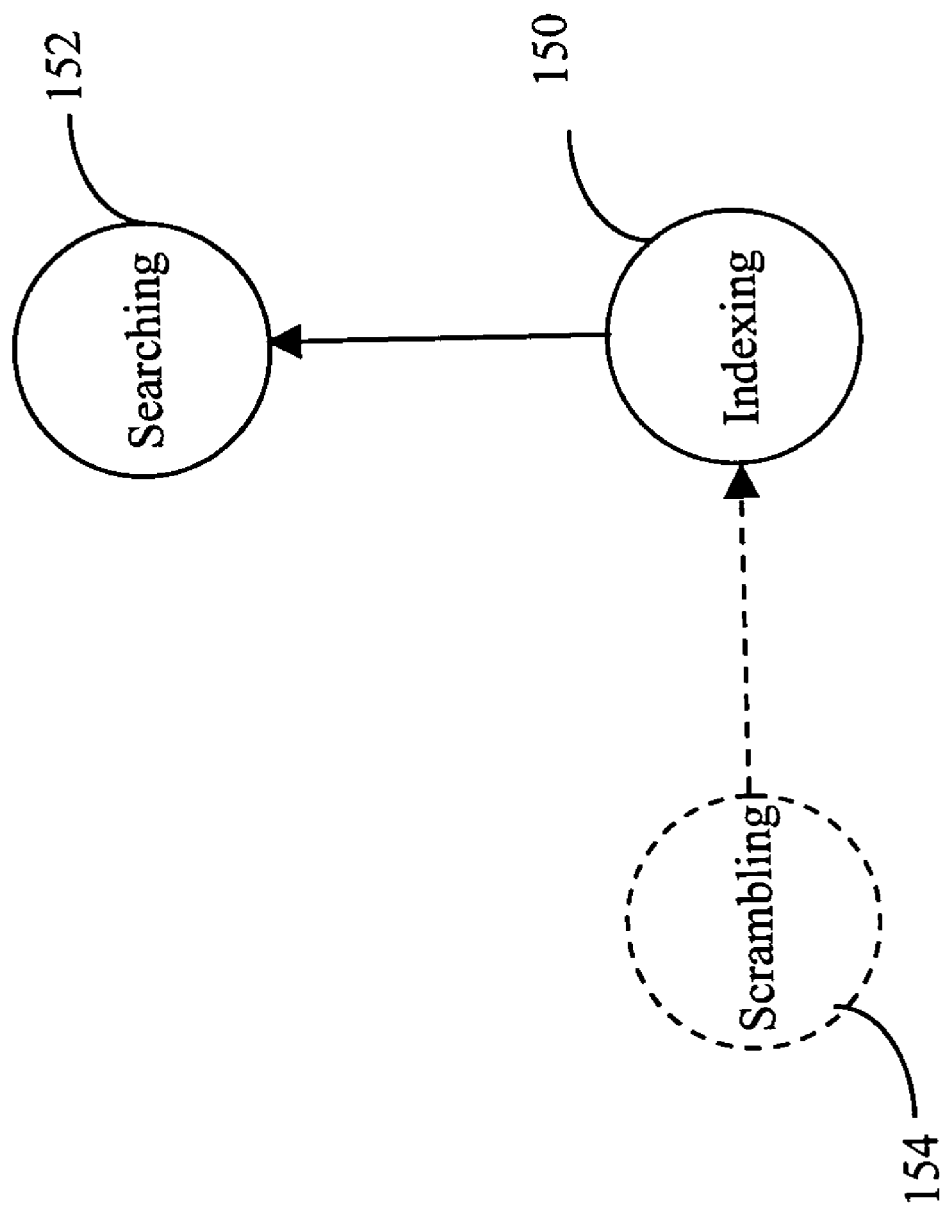

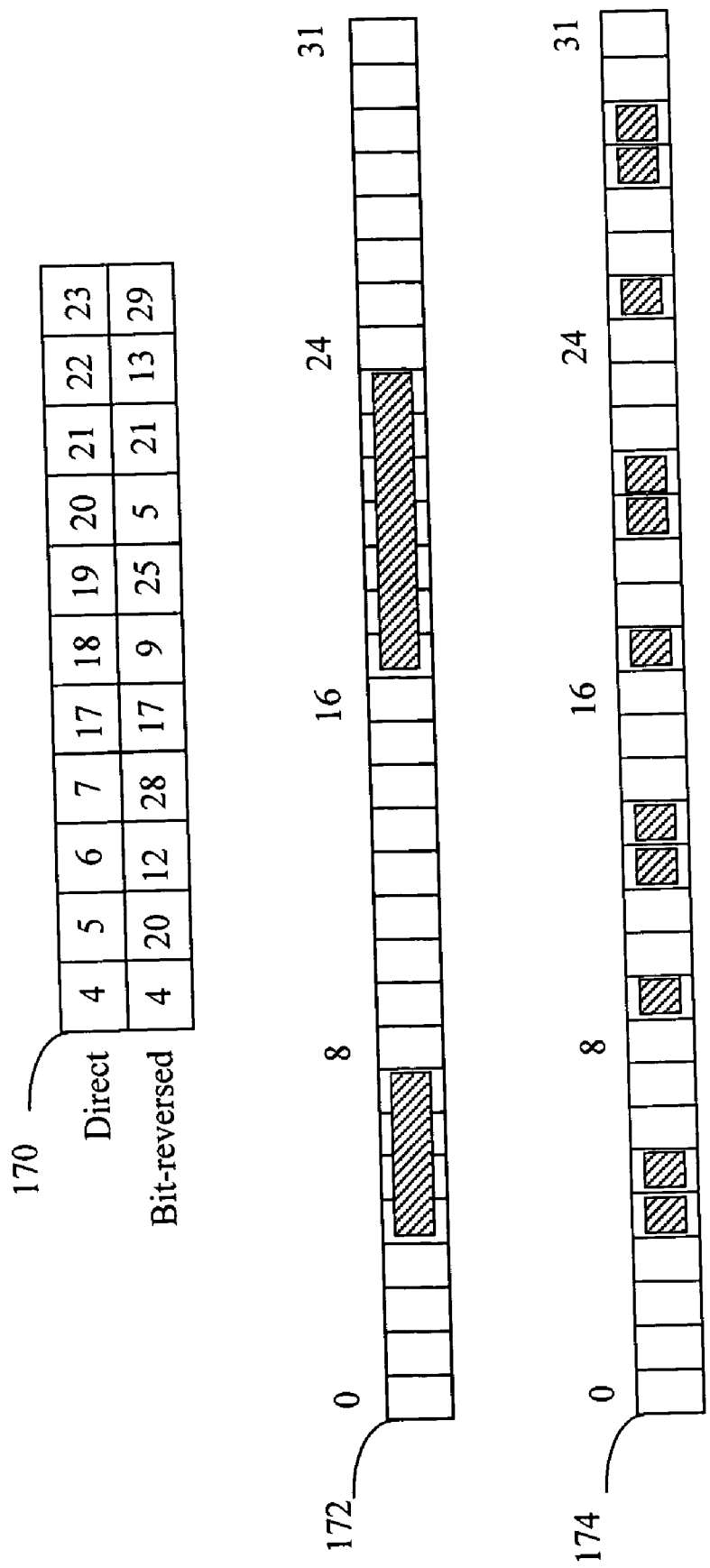

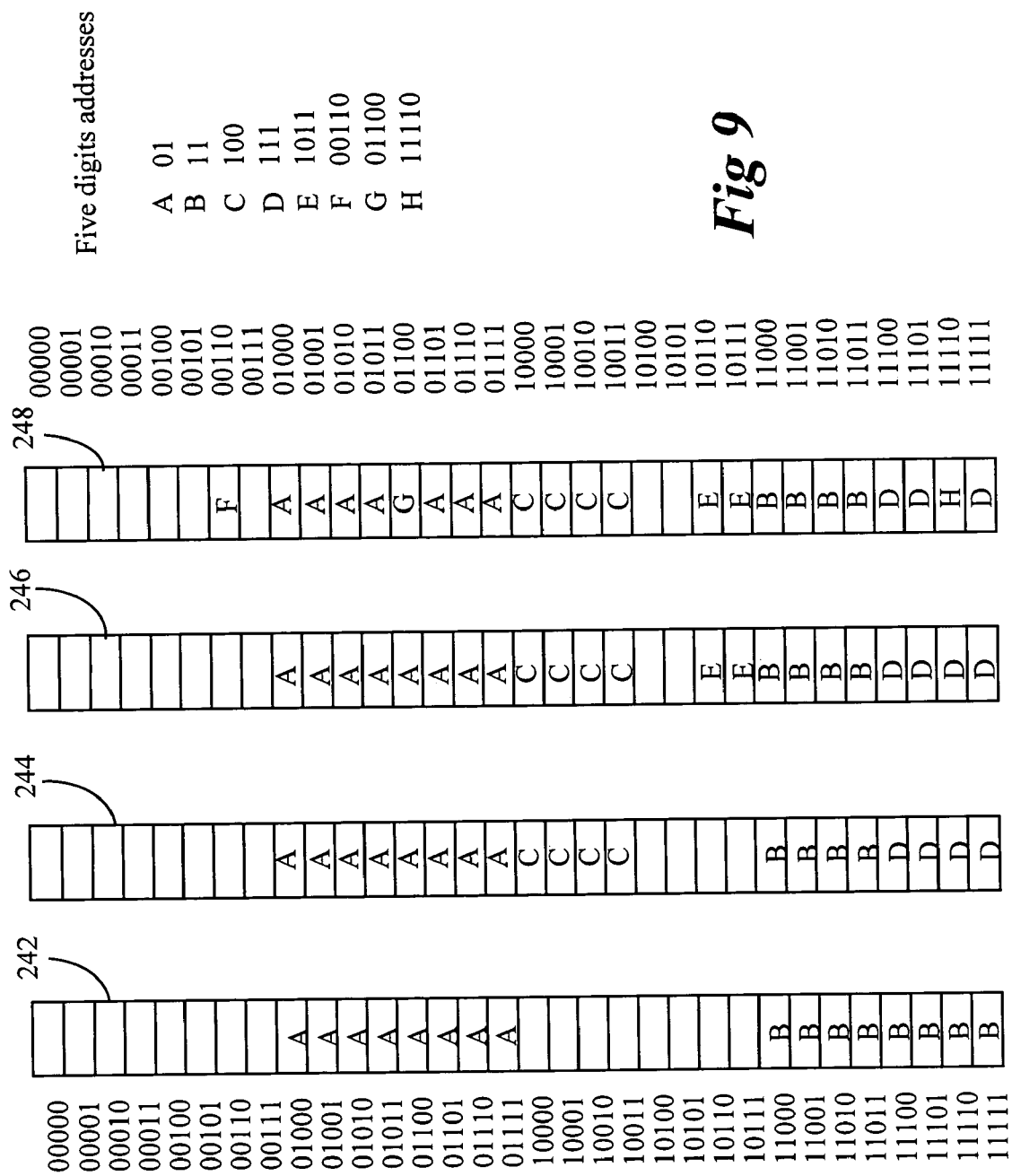

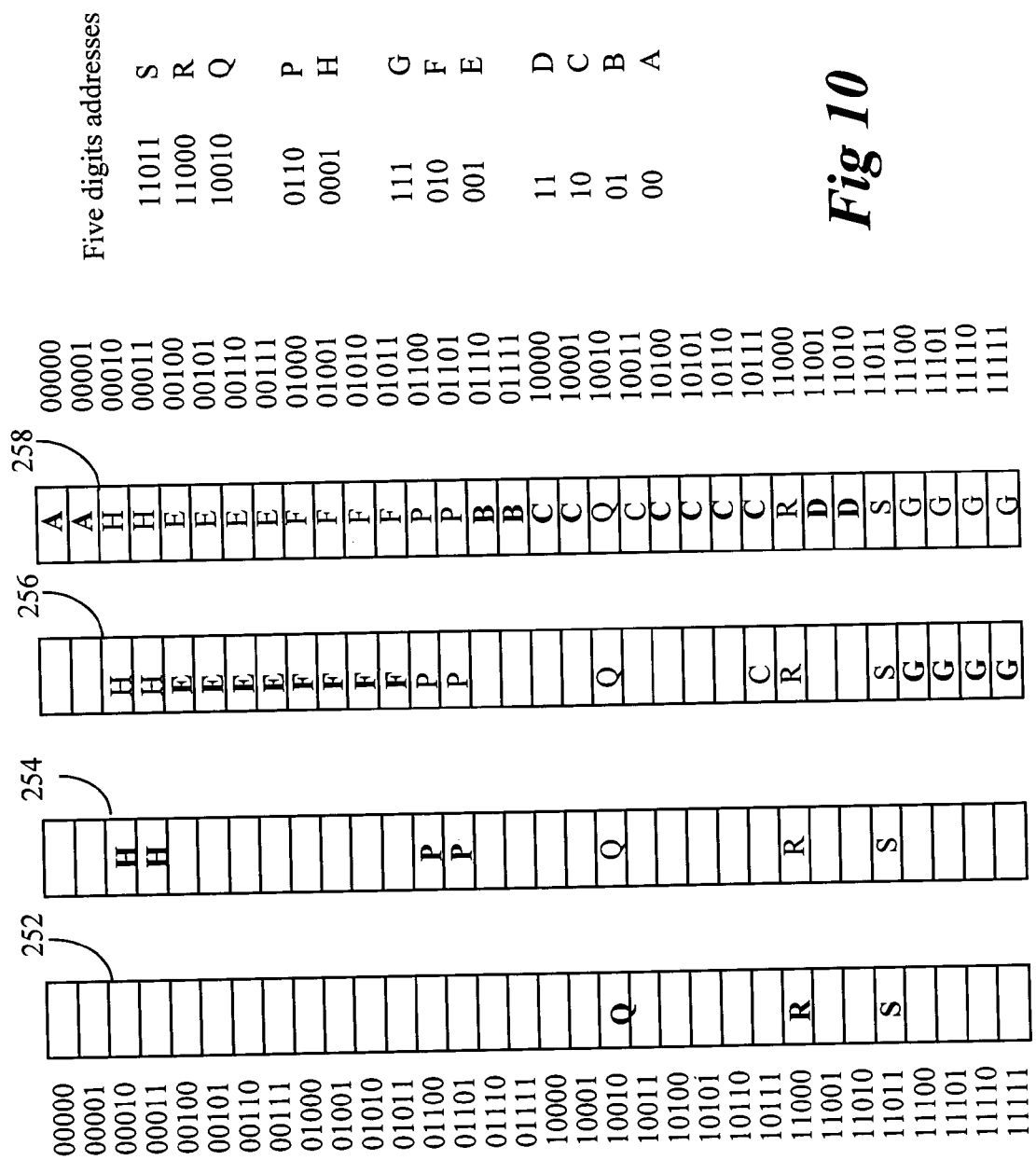

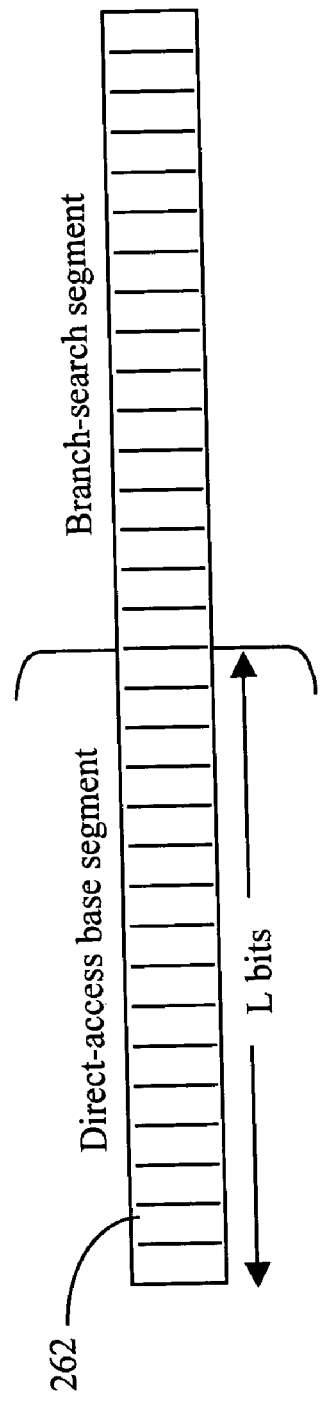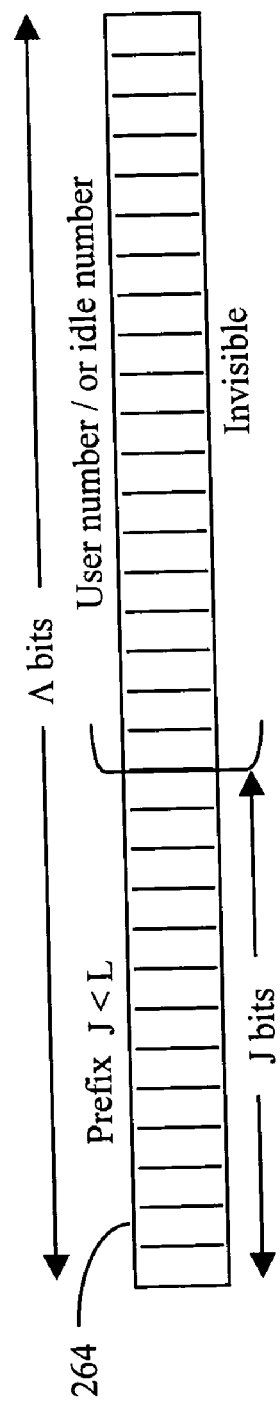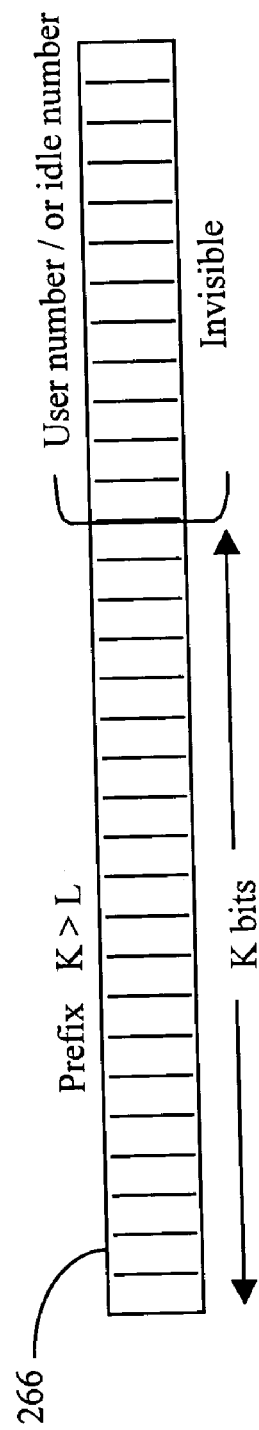

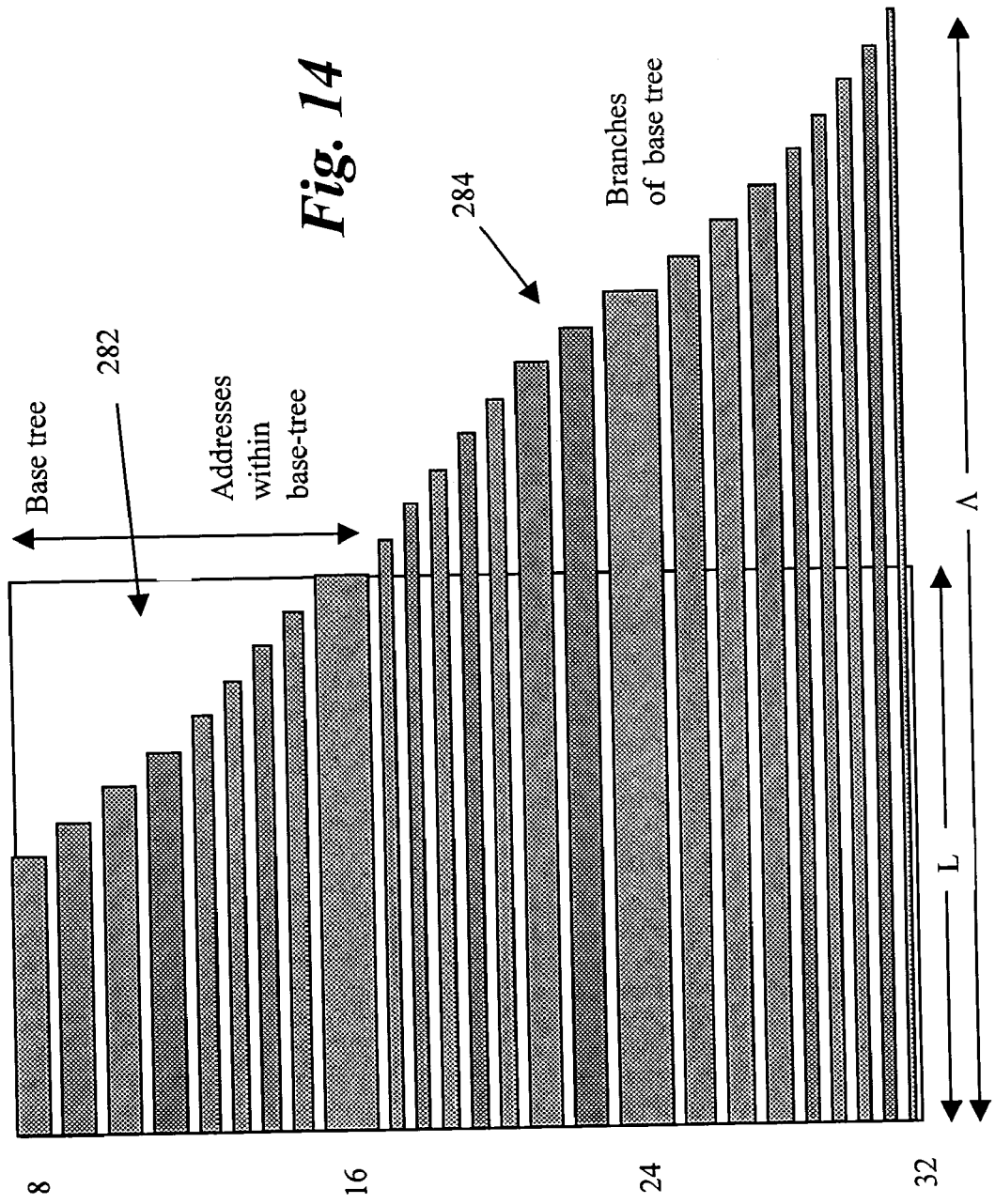

Fig 17

| w | p | t |
|---|---|---|
| 2 | 01 | A |
| 2 | 10 | B |
| 3 | 011 | C |
| 3 | 101 | D |
| 4 | 1010 | E |
| 5 | 10010 | F |
| 5 | 11000 | G |
| 5 | 10011 | H |
| 5 | 10100 | I |
| 6 | 110011 | J |
| 7 | 1010111 | K |
| 7 | 1111000 | L |
| 7 | 0010101 | M |
| 7 | 0000111 | P |
| 7 | 1100000 | Q |
| 7 | 1001000 | R |
| 7 | 1101010 | S |
| 8 | 10101111 | T |
| 8 | 00010000 | U |
| 8 | 11101111 | V |
| 8 | 00110000 | W |

IP ADDRESS RESOLUTION METHODS AND APPARATUS

This invention was made with Government support under Technology Investment Agreement F30602-98-2-0194. The Government has certain rights in this invention.

FIELD OF THE INVENTION

The invention resides in address resolution or translation in connection with data management in the field of IP (Internet Protocol), data networks, memory management and others. With high-capacity optical links, high speed address translation is needed. The methods and apparatus devised for translation must also anticipate and consider a potential significant growth of the prefix directory. In a particular aspect, the invention is directed to high speed IP address translation techniques which are to be used in IP nodes.

BACKGROUND OF THE INVENTION

IP scalability is somewhat limited by the address resolution mechanism. An optical-fiber link of 80 Gb/s capacity, for example, would required an address resolution mechanism capable of identifying some 40 million addresses per second, with a mean packet length of 2000 bits. This can be provided by brute-force duplication of an address-resolution mechanism. It can also be realized by elegant designs.

In addition to legacy routers, nodes which attempt to control the quality of service by creating connections for otherwise connectionless traffic must be able to translate the addresses of incoming packets, belonging to either connectionless or connection-based traffic. High-capacity nodes are desirable in order to reduce the number of hops between origin and destination.

The address translation considered in this disclosure may be stated as follows, with the help of FIG. 1 which illustrates graphically the translation problem 100 in generic terms:

An address space S 102 contains a large number of addresses of equal length, i.e., each address has the same number of bits. Only a small subset of the addresses is assigned to network users. The assigned addresses may appear in clusters 104. Each assigned address 106 is associated with a translation. To determine the translation of an arbitrary address, the address must first be located in the address space 102. Each assigned address 106 in the address space 102 maps to an address 108 in a condensed address space (an address table) 110. In other words, a set R of M addressable entities is stored in an address table (routing table) 110. The addresses of the address table are preferably stored in consecutive location in a memory. Each of the M entries has at least two fields, one containing an address and the other the corresponding translation. The translation may be the desired result or a pointer to a block of data containing the sought information about the address. The set R belongs to an address space S and each member in R belongs to the address space S. The address space S can be vast, having a very large number, N, of elements. Thus, while the set R can be stored in a memory device, the address space S cannot practically be stored. For example, in the Internet protocol IPv4, N is about four billions, while M is typically about sixty thousands. Thus the ratio N:M is of the order of 60,000.

As seen in the above discussion, there is an enormous address space, which is sparsely populated by a much-smaller number of assigned addresses. The addresses are of fixed length B; for example, in IPv4, an address has a length of four bytes (B=32 bits). Due to certain practical requirements imposed on the operation of the network, the division of the address space is done in such a way as to satisfy certain topological criteria and network layout considerations. Each address, of length B=32 bits for example, is segmented into two parts: J and B−J. The first segment J is often called a prefix. The prefixes have different lengths (different number of bits), and a prefix can be embedded in another prefix in a hierarchical fashion. The prefixes are unique and only the prefix portion of an address is meaningful to the network. The prefixes known to a network node are stored in an address table together with a translation for each prefix. If two or more addresses have the same prefix, they appear in the address table as a single entity. Thus, there are $2^{(B-J)}$ potential addresses corresponding to a segment of J bits, many of which may be unused. With B=32 and J=20, for example, there are $2^{12}$ (that is, 4096) addresses of the same prefix. These (B−J) bits have only local significance to the receiving node. The purpose of the address-translation mechanism in a network node is to find the translation corresponding to any given prefix.

Thus, the translation problem is summarized as follows:

An address X in address space S is received from a source external to the translation device, and it is required to determine if it belongs to the set R, and if so to extract the corresponding translation and communicate it to the source or an agent of the source. If the elements in R and S are always of a same length, the translation can be a relatively simple task. An element in R may, however, be of any length between a minimum and maximum. In the IPv4 case, the address X has two segments, and the total length B is 32 bits. Only the first segment is of interest across the network. The translation device is aware of the total length of X but not the length of either segment. Furthermore, several entries in R may be identical to a leading portion, starting from the first bit, of the incoming address X. It is possible that two addresses with prefixes J and K, with K>J, have the same first J bits. In the IPv4 hierarchical structure, the entry in R with the highest coincident leading portion, of K bits say, is the sought address. If K=0, the address X does not belong to R.

FIG. 2 shows an address translation mechanism 120 which after having determined the translation (desired output port for example) corresponding to the requested address, routes a respective packet received at its input port to a desired destination. The address to be translated may be either a destination address or source address. A router receives packets at its input ports and routes them to proper output ports according to the addresses found in the packets' headers. Referring to FIG. 2, which depicts a mechanism for packet parsing, a packet arrives at an ingress port 122 and a parsing unit 124 separates its address from the packet. Both the address and the remainder of the packet are assigned a cyclical request number at block 126 from a pool of available numbers for managing the address translation process. The cyclical request numbers range from zero to a number that is sufficiently large to avoid depletion of available cyclical numbers. The assigned cyclical number is attached to both the address and the packet itself as indicated in blocks 128 and 130 of FIG. 2. The address with the request number is sent to address translation block 132 while the packet is stored at packet storage 134, generally in contiguous locations. In a forwarding process, the address translation block 132 determines the destination to which the stored packet should be transported based on the packet's address. By using the cyclical request number, the packet storage can be directly indexed and the packet can be associated with the translation of the address. At unit 140, the separated address is combined with the packet indexed in the packet storage 134 and the combined packet together with the translation result are returned to the port from which the requested packet has arrived or to any specified processing unit. The request number is returned to the pool of cyclical numbers for reuse when the translation is complete. The ingress port is now ready to forward to desired egress port the packet whose address has just been translated. It is also possible that both data packets and address be identified by ingress port number as well as translation request number.

FIG. 3 illustrates a known queuing mechanism 160 at a communications node which stores packets arriving at each ingress port in its ingress buffer 162 and indicates the location of each stored packet 166 in a pointer array 164. The length of array 164 is at least equal to the largest number in the set of cyclical translation request numbers. Array 164 is indexed by the assigned translation request number. When a packet assigned a translation request number X is queued in position Y in buffer 162, the number Y is written in the $X^{th}$ entry in array 164. When the translation of the head-of-line packet in buffer 162 is complete, the $X^{th}$ entry in array 164 is reset to null.

U.S. Pat. No. 5,414,704 May 9, 1995, Spinney, describes an address lookup technique in packet communications links of Ethernet, token ring or FDDI type. The technique uses a combination of programmable hash algorithms, binary search algorithms, and a small content-addressable memory (CAM). The CAM is used for finding a direct match of an address. For a search of other global addresses, hashing is used to produce local addresses of smaller widths and a balanced binary tree search finds a desired address from the hash table and the translation table.

In U.S. Pat. No. 5,425,028 Jun. 13, 1995, Britton et al, protocol selection and address resolution for programs running in heterogeneous networks are described. According to their invention, a program address is registered in the network so that it becomes available to other programs that understand the address, even if they are running over a transport protocol that does not understand the address format.

U.S. Pat. No. 5,812,767 Sep. 22, 1998, Desai et al, describe a system for user registering an address resolution routine to provide address resolution procedure which is used by data link provider interface for resolving address conflicts. An information handling system includes a number of stations connected in a network configuration, each station including a processor, a storage and an I/O controller. The processor operates under control of an operating system control program which is divided into a user (application) space and a kernel (system) space.

In U.S. Pat. No. 5,796,944 Aug. 18, 1998, Hill et al, an address management circuit and method of operation, for use in a communications internetworking device, includes a search engine having first and second search circuits for concurrently searching a network address table for source and destination addresses of a frame received by the communications internetworking device. Memory read cycles of the source and destination address searches are interleaved to allow a memory access to occur during every system cycle to thereby rapidly complete the searches for both the source and destination addresses.

A single indexed memory provides a simple means of address translation. In the Internet Protocol, the use of a single indexed memory is impractical. Even with IPv4, which uses a 32-bit address, the number of indexed-memory entries would be about 4-billions. It is possible, however, to exploit the fact that typically the prefix length is significantly smaller than 32 for a large proportion of the prefixes in the prefix directory. This property facilitates multi-stage indexing. A two-stage indexing approach was adopted by Gupta, Lin, and McKeown in their paper titled "Routing lookups in Hardware at Memory Access Speeds", IEEE Infocom, 1998, pages 1240–1247. In their approach, a first memory is used for direct indexing using the first 24 bits of an IPv4 address. A second memory is used for prefixes whose lengths exceed 24. For each entry in the first memory that corresponds to a prefix greater than 24, an indexed extension array of 256 entries is used to translate the respective address. If an extension array does not have a valid entry in a range {X to 255}, with X<256, then the indexed array can be truncated to a length of X. This may save memory storage to some extent.

The technique of Gupta et al is in fact very efficient and economical to implement for IPv4 with its current prefix distribution. However, it suffers from a major shortcoming: it is heavily reliant on the assumption that the number of prefixes exceeding 24 is relatively small. With the growth of the Internet, and as new prefixes are assigned to new users, the distribution of the prefix length is likely to spread. This would render the technique impractical. For example, if only 10% of the entries in the first index stage extend to the second stage, then the second memory must have about 400 million entries, each entry including a translation. Furthermore, it is plausible that the address length, hence the prefix length, be extended to accommodate future demand. A 5-byte address, for example, would require excessive memory sizes. The memory size can be reduced to some extent by using several indexing stages, however, the memory requirement would still be prohibitive. Another factor to be taken into account is that the memory access speed decreases as the memory storage capacity increases.

SUMMARY OF THE INVENTION

Briefly stated, in accordance with one aspect, the invention is directed to a method of translating addresses of a predetermined length. The method comprises a step of resolving the address to a prefix, if the address is found in a primary translation table, the primary translation table containing prefixes whose lengths are less than a predetermined value less than the length of the address and locations of branch data structures a plurality of secondary search units. The method further includes steps of performing a secondary search in the secondary search units in parallel, if the primary translation table indicates the locations of branch data structures to begin each secondary search for prefixes whose lengths are larger than the predetermined value and translating the addresses to prefixes, if the prefixes are found in the secondary search.

In accordance with yet another aspect, the invention is directed to a method of encoding a number H>0 of independent trees of known prefixes and respective prefix translations, the encoded trees being stored in a single memory. The method includes a step of constructing a data structure having a table V storing pointers and a table T storing translations wherein each of the H encoded trees is identified by a root with corresponding entries in tables V and T.

In accordance with a further aspect, the invention is directed to a method of resolving B bit long addresses of packets into prefixes of any length up to B by the use of a data structure which comprises a length sorted table Q and a plurality of secondary search units, table Q containing data related to prefixes of length less than A, A≦B and each secondary search units including tables V and T which are in one-to-one correspondence to one another and each consists of a 2×M memory, M being a positive integer. The method comprises steps of indexing table Q by using the first A bits of an address to generate a corresponding prefix of length equal to or less than A, or a pointer to a secondary search unit and accessing table V of the secondary search unit indicated by the pointer using each successive remaining bit of the address in order. The method further includes steps of accessing table T of the secondary search unit at each successive location corresponding to the location of table V accessed in the above step and reading a valid data contained at the location in table T, the valid data being a prefix of length more than A.

In accordance with another aspect, the invention is directed to an apparatus for address translation of a packet. The apparatus comprises a parsing block for receiving the packet and parsing address, each address having length B, B being a positive integer and an indexing block for selecting the first A binary bits of each received address, A being a predetermined positive integer and A≦B and for directly accessing a sorted prefix directory by the first A binary bits, the sorted prefix directory containing translated prefixes of length N equal to or shorter than A and data specifying one of a plurality of secondary search units. The apparatus further includes the plurality of secondary search units having the plurality of secondary memories for searching in parallel through the secondary memories specified by the indexing block for prefixes of length N longer than A, each secondary memory comprising tables V and T in that tables V and T are in a one-to-one correspondence to one another and each consists of a 2×M memory, M being a positive integer, table V for accessing successive location for each successive bits above A of the addresses and table T for translated prefixes at a location corresponding to the location accessed in table V.

In accordance with one aspect, the invention is directed to an address translation apparatus for telecommunications networks in which packets are transported to addresses contained therein. The apparatus comprises an address separation unit for separating from a packet an address to be translated and a primary translation unit having a primary translation table for translating the address to a prefix, the primary translation table containing prefixes whose widths are less than a predetermined value and locations of branch search data structures in a secondary search unit. The apparatus further includes a plurality of secondary search units for performing secondary searches in parallel, each secondary unit having the branch search data structure for performing each secondary search and translating the address to a prefix, if the primary translation table indicates the location of a branch search data structure to begin the secondary search.

In the approach adopted in this application, an indexed memory of a moderate depth, having $2^{16}$ entries (65536 entries) for example, is used to split the incoming addresses. The prefixes that are not recognized by indexing are forwarded to parallel secondary searching units with moderate memory requirements that depend only on the size of the prefix directory and not the prefix length. For example, if the prefix directory expands from the current (roughly) 60,000 entries to a million entries, even if each prefix exceeds 16-bits, together with an extension of the address length to more than four bytes, the memory requirement for the parallel secondary search would still be of the order of 1 million entries.

BRIEF DESCRIPTION OF THE ACCOMPANYING DRAWINGS

FIG. 3 illustrates a known queuing mechanism which stores arriving packets at each ingress port in a buffer and indicates the location of each stored packet in a pointer array.

FIG. 4c illustrates the address spacing within the address space when a pragmatic address scrambling procedure is used to scramble the clustered addresses of FIG. 4a.

FIG. 5 depicts the steps needed to implement a high-capacity address translation mechanism.

FIG. 6 illustrates the function of the scrambling unit.

FIGS. 9 and 10 show the details of constructing an indexing array.

FIG. 11 shows the partitioning of a 32-bit address into two fields, an indexing field and a search field, to enable an indexing-searching process.

FIG. 12 shows an address with a prefix of length that is shorter than the length of the indexing field.

FIG. 13 shows an address with a prefix length greater than the length of the indexing field.

FIG. 14 is a histogram representing a typical prefix-length distribution in the Internet. In FIG. 14, the categories of prefixes shorter than or equal to L, L being 16 in this illustration, can be identified by indexing only, while the categories of prefix lengths exceeding 16 require a further search process.

FIG. 17 illustrates the construction of a multi-branch search table in which independent branches are encoded in the same data structure.

FIG. 19 is an example of a prefix directory.

FIG. 20 illustrates three phases of the indexing-searching process using the example of FIG. 19.

DETAILED DESCRIPTION OF THE PREFERRED EMBODIMENTS OF THE INVENTION

Figure 1:
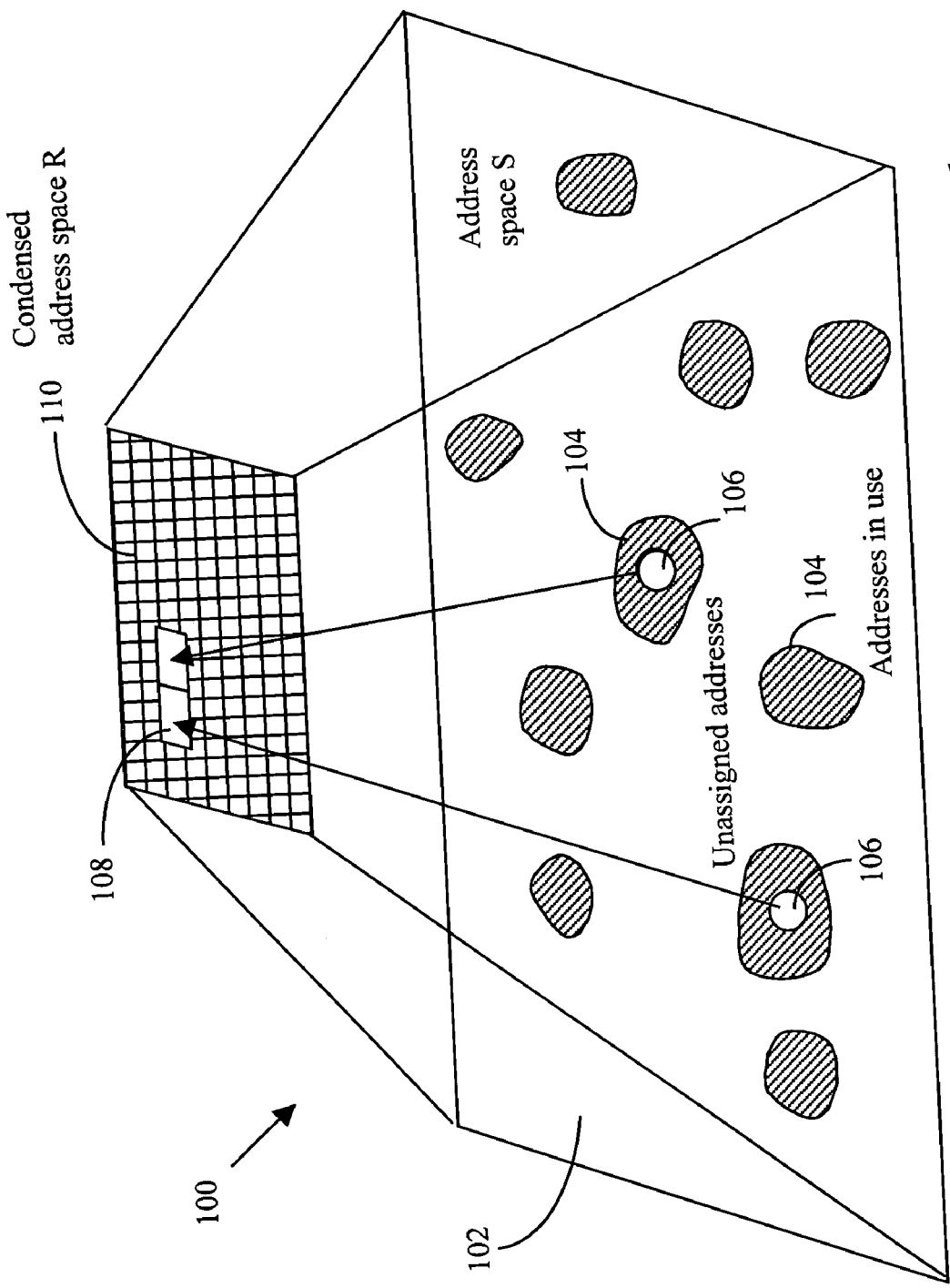
FIG. 1 illustrates the translation problem.
Figure 2:
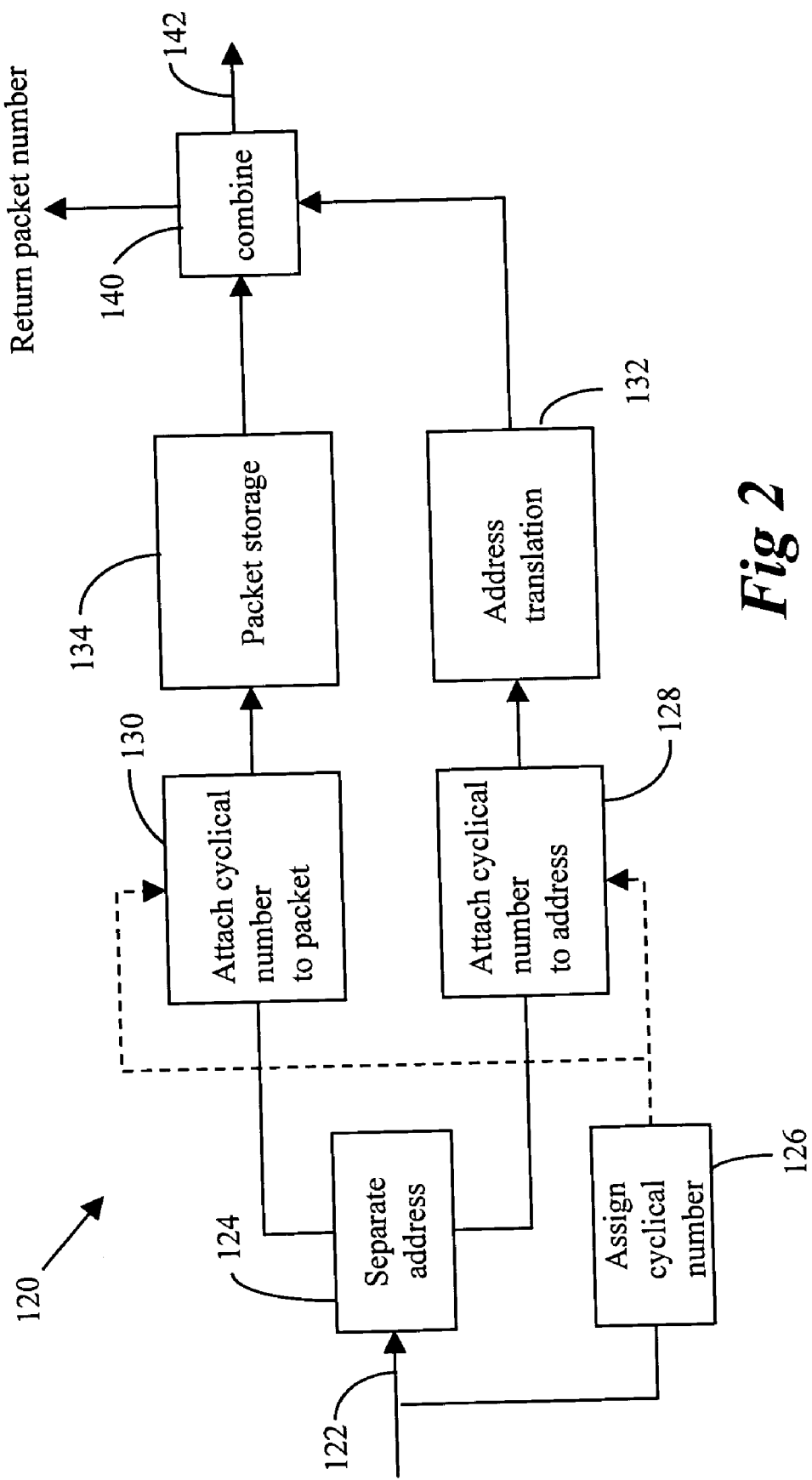
FIG. 2 shows a mechanism for receiving packets from an input port, parsing the packet to separate an address, and determining the translation corresponding to the address.

The invention includes one or more of the following concepts; partial address scrambling, concurrent lookup without directory duplication, and encoding interleaved independent (branches) in a shared memory.

1. General Discussion of the Techniques

The address translation method can be developed by investigating two fundamental techniques that make up the address translation: indexing and interleaved searching. In addition to these fundamental techniques, another technique, partial address scrambling, can be advantageously employed to further improve the design of the address resolution mechanism.

a Indexing Technique

A direct address memory for direct indexing can be prohibitively large. In IPv4, for example, such a memory should have the capacity to store 4-billion translations. The use of a single direct-access memory holding this data would be impractical. The use of a hierarchical two-dimensional memory structure is possible, however, the number of memories would be quite large. For example, a first stage memory of 64K entries would select one of up to 64K secondary memories each of which would store up to 64K entries. The process of selecting one of several thousand secondary memories is not a simple task.

b Searching Technique

The searching technique described in this specification requires a number of memory-access operations determined by the number of bits in the prefix. The translation time is then determined by the prefix length and the efficiency of the search method. The search process requires several memory-access steps which increase the translation time. This necessitates the use of parallel search as describe below.

c Compound Indexing-Searching Solution

Instead of a multi-dimensional indexing, which may require enormous storage, it is possible to perform partial indexing followed by parallel branch searching. Tree searching requires several memory-access operations per address, but with several such searches being performed in parallel, the translation rate (the number of address translations per time unit) can be increased to exceed the rate determined by the single memory-access operation of a one-dimensional indexing stage. Thus, indexing followed by branch searching can yield a translation rate of the order of 20 mega addresses per second, with a total time of memory-access, and other related operations, of the order of 50 nanoseconds.

2. Indexing Implementation

One-dimensional indexing, requiring only a single-memory access per address, can be performed directly if the prefixes are of a fixed length. If the length is 18 bits, for example, then about 256,000 entries need be available, even though a large proportion of the entries may be unassigned. The prefixes considered here are, however, of variable length and direct indexing can only be applied after a process of reconstruction of an address directory from the prefix directory as will be described in detail below.

The number M of prefixes in the respective directory is typically much less than the size of the address space, $M \ll 2^B$ being the address length in bits. L-bit indexing uses the first L bits of an address of an incoming packet for directly indexing a memory of $2^L$ entries, $0 < L \leq B$. Some prefixes may be shorter than L. This requires that some prefixes have to be appended to fill all the $2^L$ entries. Indexing is limited mainly by the size and speed of the indexed memory. This normally requires that L be limited so that a memory of sufficient storage with an acceptable access time can be used.

a Reconstruction of the Address Directory from the Prefix Directory

A prefix of J bits in an address of B bits may represent the J most significant bits of a number of addresses ranging from 1 to $2^{(B-J)}$. If B=32 bits and J=10 bits, for example, then the J bits may be the prefix of up to $2^{22}$, i.e., 4 million, addresses, but typically the number of addresses stemming from the prefix would be smaller than this upper bound by several orders of magnitude.

It is possible to construct an address-translation array which includes all the addresses stemming from any prefix of J bits by simply writing the translation corresponding to the prefix in all consecutive positions in the array starting from an index formed from the J bits of the prefix as the most significant bits followed by (B−J) zeros, to an index formed from the J bits of the prefix as the most significant bits followed by (B−J) ones. Such an array would normally be prohibitively large and the vast majority of its entries may correspond to non-existent addresses.

If an array as described above can be constructed and is accessible, the translation function would require only one memory access. Storing the array in a single memory is difficult and using multiple memories requires a hierarchical structure and, hence, multi-dimensional indexing. In a two-dimensional structure, a first memory stores $2^L$ translations or pointers to a secondary-stage memory, $0<L<B$, and up to $2^L$ second memories are indexed by the remaining (B−L) bits of each address. For example, selecting L to be 8 bits, 256 memories would be used to store the remaining bits of each address. In the IPv4 case, each secondary memory would store $2^{24}$, i.e., about 4 million addresses. Using a three-dimensional structure, a first memory may store the first L bits of each address, this results in $2^L$, i.e., 256, second-level memories. If each of the second-level memories were indexed by the next most-significant K bits, each second-level memory would be associated with 256 third-level memories; each being indexed the remaining (B−L−K) bits of each address. If L=K=8, and B=32, the maximum number of third-level memories would be $2^{(L+K)}$, i.e., 65536 memories, each having up to $2^{(B-L-K)}$, i.e., 65536 entries The number q of addresses stemming from the prefixes in a prefix table may be substantially less than the size of the address space S. Nevertheless, the number q can be larger than the number of assigned addresses by several orders of magnitudes.

As will become apparent in the remaining part of the specification, in some embodiments, the invention combines both (partial) indexing and searching techniques to realize novel address translation mechanisms that are fast yet requiring less memory space. The invention comprises the partial indexing stage followed by an interleaved-searching stage. The partial indexing state employs direct memory access using a predetermined number of most significant bits in addresses requested to be translated to find matched prefixes. The searching stage is performed for the remaining bits in an address only when the first stage fails to produce a match. In a preferred form, the searching stage uses a parallel searching process to increase the speed as will be described further below.

3. Searching Implementation

A prefix directory R has M prefixes, and a translation for each address. The translation of an address is generally a pointer to a storage location. For example, the pointer may point to an egress port number in a router, or to a location in a memory storing data related to the address. The number of bits in an address may vary between 1 and an upper-bound B, B being 32 in the Internet Protocol IPv4.

The prefix directory must be encoded in a data structure that facilitates a translation. According to one of the embodiments, the data structure uses two tables V and T, each of a size exceeding 2×M words. A conservative estimate of the size is 2×2M. The tables V and T are preferably stored in separate memories. Table V stores pointers and table T stores the required translations. All entries in Tables V and T are initialized as zeros. An entry in table V is an integer number between 0 and M. An entry of 0 in table V indicates a search termination. Each of the tables V and T has two rows and several columns. An entry in table V that is greater than zero is a pointer to a column in table V or table T. There is a one-to-one correspondence between an entry in L and entry in T. An entry in table T is an integer number between 0 and W, where W is the largest translation value. An entry of zero in table T indicates an unknown address translation.

a Construction of the Search Tables for Multiple-Independent Branches

The algorithm for constructing the tables V and T is given below. The $j^{th}$ prefix, i.e., the prefix in position j in the prefix directory R, has $m_j$ bits and a translation G. The bit in position d, $0 \leq d < m_j$, in the $j^{th}$ prefix, is denoted $D_{j,d}$. The value of $D_{j,d}$ is either "0" or "1". The algorithm allows the encoding of multiple independent trees (branches) in a single memory. An address is decoded (i.e., translated) using the data structure. The number of independent trees (branches) in a single memory is denoted H, $1 \leq H \leq M$.

Prefix Encoding Algorithm

To insert a prefix of translation G and belonging to address branch h, $1 \leq h \leq H$, set K=H+F and y=h+F, F being an arbitrary integer offset representing a reference memory address. F may be zero for example. Then, initializing tables V and T by zero entries, the following algorithm is executed:

```
for 1≤j≤M
{
    for 1≤d<m_j
    {   x=D_{j,d}
        if (V(x, y)>0),    y=V(x, y);
        else {K→K+1,        V(x, y)=K, y=K}
    }
    for d=m_j, x=D_{j,d}, T(x, y)=G
}
``` b Address Decoding: Translation Using the Search Tables V and T

An address is received having a fixed number of bits B. The outcome of the translation process is an integer between 0 and an upper bound W. An outcome of 0 indicates an unknown address, i.e., an address with an unknown translation.

Let $u_j$ be the $j^{th}$ bit of the B-bit received address, and the address is known to belong to address branch h. The procedure of finding the translation (which may be a null value) is as shown in the decoding algorithm below:

```
y=h, t=0,
for 1≤d≤B
{
    x=u_d, if (y = 0) exit;
    if (T(x, y)>0) t=T(x, y) );
    y=V(x, y);
    if (V(x, y)>0) y=V(x, y)
}
```

If t is greater than zero, it is a valid translation. Otherwise, the translation cannot be determined from the routing table R.

The above search procedure is quite simple but it requires several memory-access processes. The number of memory-access processes depends on the number of digits B. The search is, however, often completed in less than B steps as indicated by the 'exit' condition in the above address-decoding algorithm.

4. Duplication vs. Partitioning of Prefix Directory

The simplest way to perform parallel translation is to use several copies of the routing table (prefix directory). Several routing tables that can be accessed independently from each other would be needed. If the size of the routing table is relatively small, of the order of several thousands for example, the use of a multiplicity of routing tables, requiring several storage memories, may be acceptable. As the size of the routing table increases, to several million addresses for example, duplication of the routing table would become undesirable. In any case, it is necessary to ensure that addresses of the same traffic stream are processed by the same translation module in order to ensure that the translations of addresses of the same stream are performed in sequence.

With B=32 bits, if the first 16 bits are used for direct look-up (direct indexing), then 16 bits are left for a multi-memory-accesses search procedure. The direct indexing requires a single memory access per address. The search requires a maximum of 16 accesses and the computation of the realizable translation rate should be based on this upper bound. The search time can be of the order of 320 nsec (with a memory-access time of 20 nsec), yielding a total translation time of some 400 nsec.

Using 16 search units in parallel, and considering that a proportion of address-translation processes may not proceed to the search step, the realizable translation rate would be determined primarily by the first-stage direct indexing step which becomes the bottleneck.

5. Partial Address Scrambling

Figure 4A:
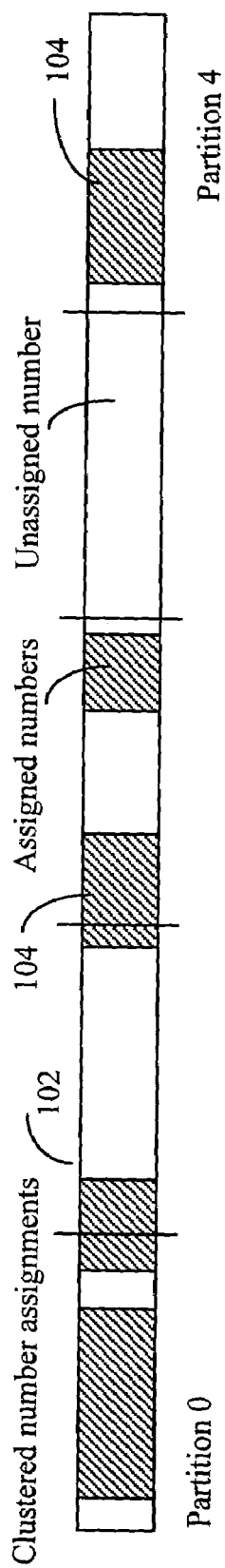
FIG. 4a illustrates the clustering of addresses that may occur in the address space.

The assigned addresses may not be evenly distributed within the address space. When multiple search mechanisms are used to increase the translation rate, clusters, as illustrated in FIG. 4a, of addresses within the address space lead to uneven loading of the search mechanisms and, hence, a reduced translation rate. A step can be provided in the search procedure to provide a means of load balancing which attempt to equalize the processing loads of the secondary search devices. This can be done in several ways. One way to smooth the distribution of assigned addresses is to apply a scrambling function to the addresses in the routing table and to apply the same scrambling function to each incoming address. The scrambling function may be applied to the full address, or a part thereof. The scrambling function must, however, be applied to the same bit-positions in each address. The routing table, however, contains prefixes of different sizes and not complete addresses. Scrambling may then be applied only after a "prefix complementing" process to be described below.

One simple yet effective scrambling process is the bit-reversal mapping, where a word is read in reverse of the order in which it was coded. It is noted that the one-to-one mapping need not be hardwired. Mapping patterns may be adaptively modified by implementing programmable bit mapping, where any of the input bits can be directed to any of the output bits. Other techniques such as learning techniques based on actual statistics of prefix usage may be used to separate the prefixes into groups, based on minimizing the inter-group variance. In the address translation system described in this specification, a learning-based load-balancing process may use as input all the entries in the indexing memory that require a secondary-search step. The number of such entries may be of the order of several thousands, and the balancing process may become time consuming. The process, however, may be implemented offline.

Figure 4B:
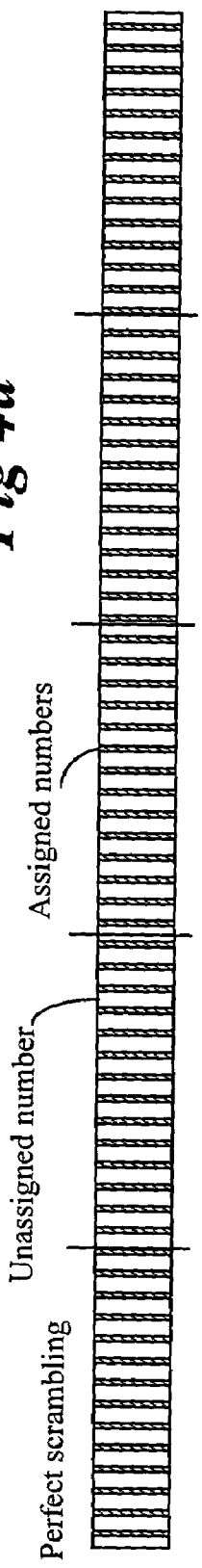
FIG. 4b illustrates a uniform distribution of the assigned addresses in the address space so that the addresses are equally spaced in the address space.
Figure 4C:
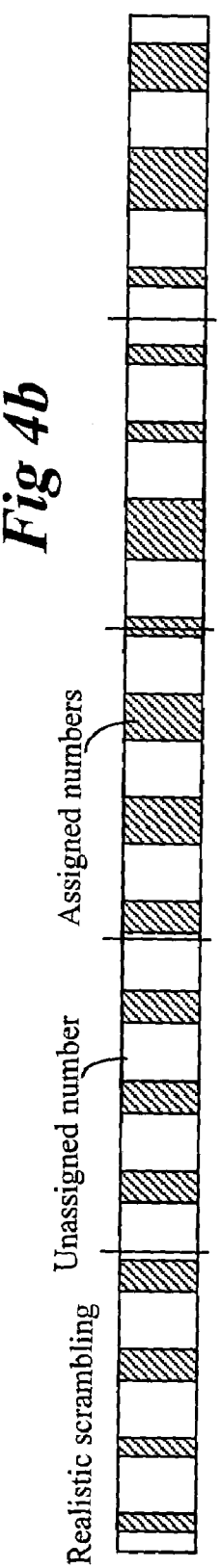

As illustrated in FIG. 1, within a vast IP address space S, only a limited number of addresses are in use and they may also be clustered in certain areas as shown. FIG. 4a illustrates differently the clustered addresses as illustrated in FIG. 1. It uses five partitions of IP addresses in a linear scale. The address space 102 has unassigned addresses and addresses in use. The assigned addresses are shown as clustered in areas 104. FIG. 4b illustrates a perfect scramble that would space the address equally throughout the address space and FIG. 4c shows a more realistic scrambling using, for example, bit reversal mapping. Scrambling is an attempt to balance the storage requirement and the translation computational effort among a number of parallel translation devices.

6. Sample Embodiments of Compound Indexing-Searching Techniques

FIG. 5 depicts an implementation concept of a high-capacity address translation mechanism according to the invention. FIG. 5 illustrates a two-stage mechanism comprising an indexing stage 150 followed by a searching stage 152. The indexing stage 150 is optionally preceded by a scrambling stage 154. The purpose of the optional scrambling stage is to attempt to equalize the gaps between consecutive assigned numbers.

Figure 24:
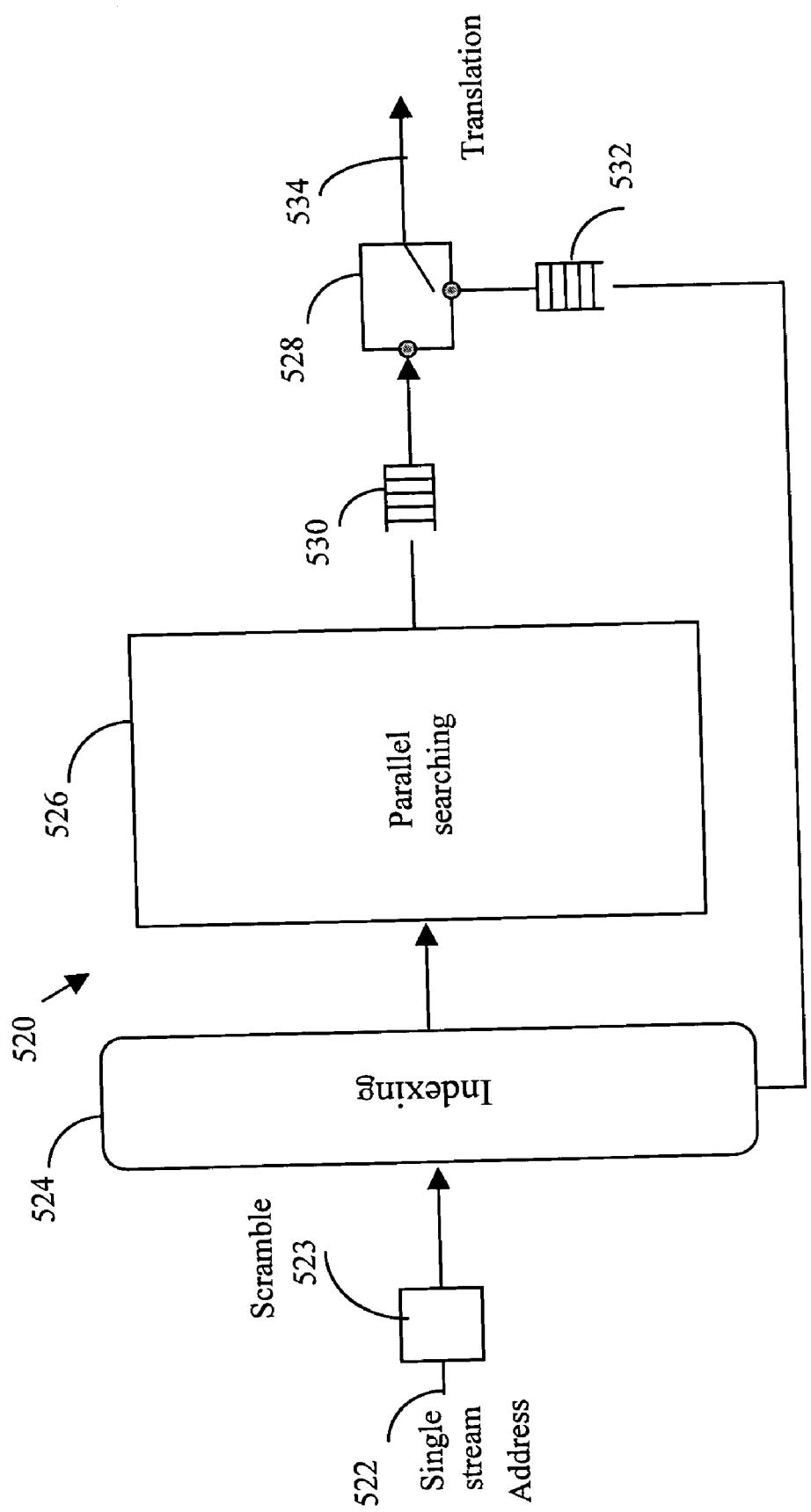
FIG. 24 is a schematic of an indexing-searching mechanism.

FIG. 6 illustrates the function of a scrambling unit associated with an input port (illustrated in FIG. 24). The figure relates to the case of a partial-indexing list of 32 entries based on a scrambled field of five bits. The direct and scrambled indices are indicated in table 170, where the scrambling is realized by bit-reversal. If the partial indices are not scrambled, the used partial indices may appear in two clusters occupying positions 4 to 7 and positions 17 to 23 in the address space as indicated in array 172. Using a reverse-binary scrambler, where each number is simply transposed, the indices appear at more spread positions as indicated in array 174.

Indexing is fast but requires a large memory the size of which is determined by the address space. Searching is slow but its memory requirement is determined by the size of the assigned-addresses table rather than the size of the address space. The size of the prefix table is normally much smaller than the size of the address space. A combination of the two techniques can be realized by dividing each address into two fields and using indexing for one field and searching for the other field. The inter-working of the two techniques will be described below.

Figure 7:
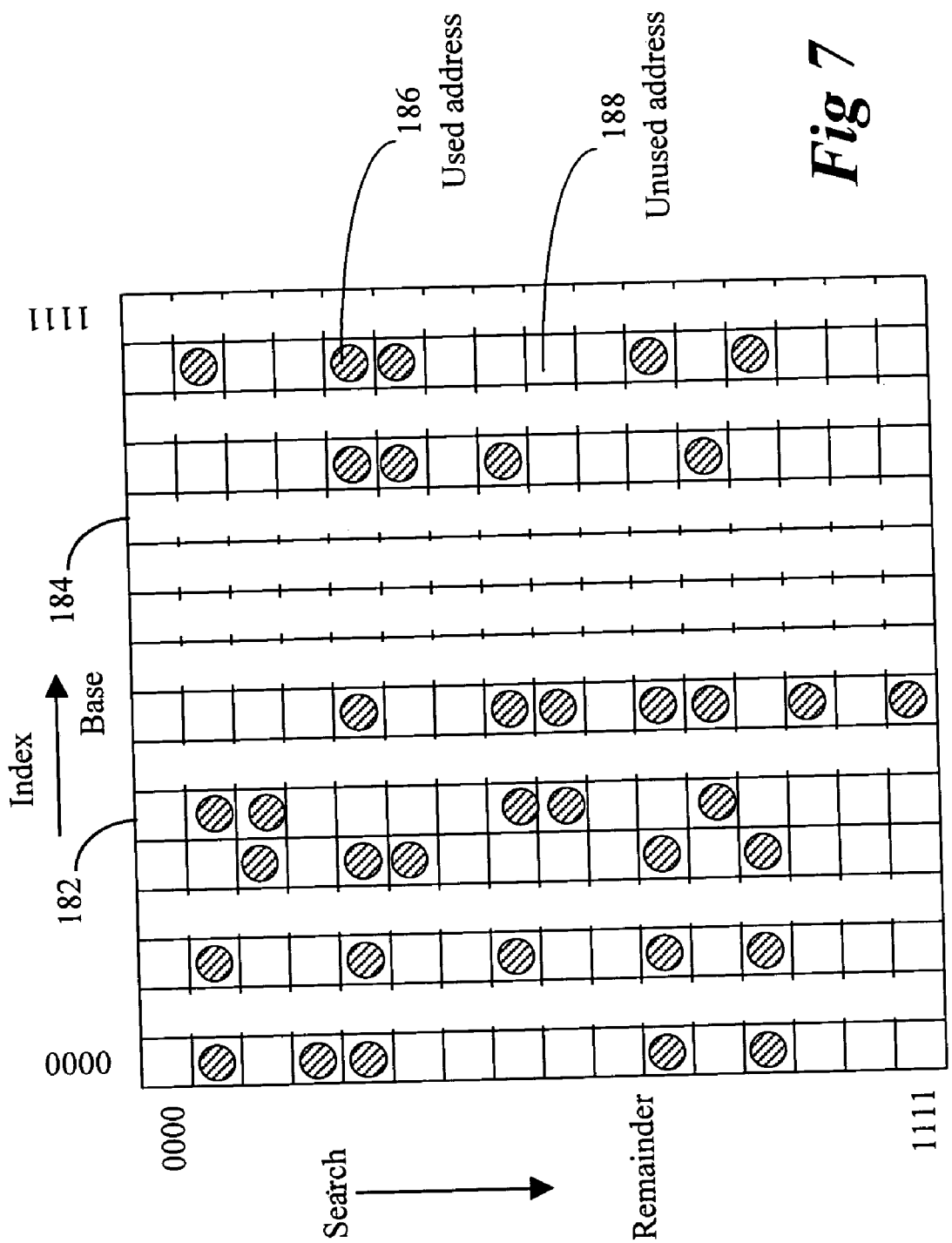
FIGS. 7 and 8 illustrate the basic approach of using an indexing stage followed by a searching stage as depicted in FIG. 5.
Figure 8:
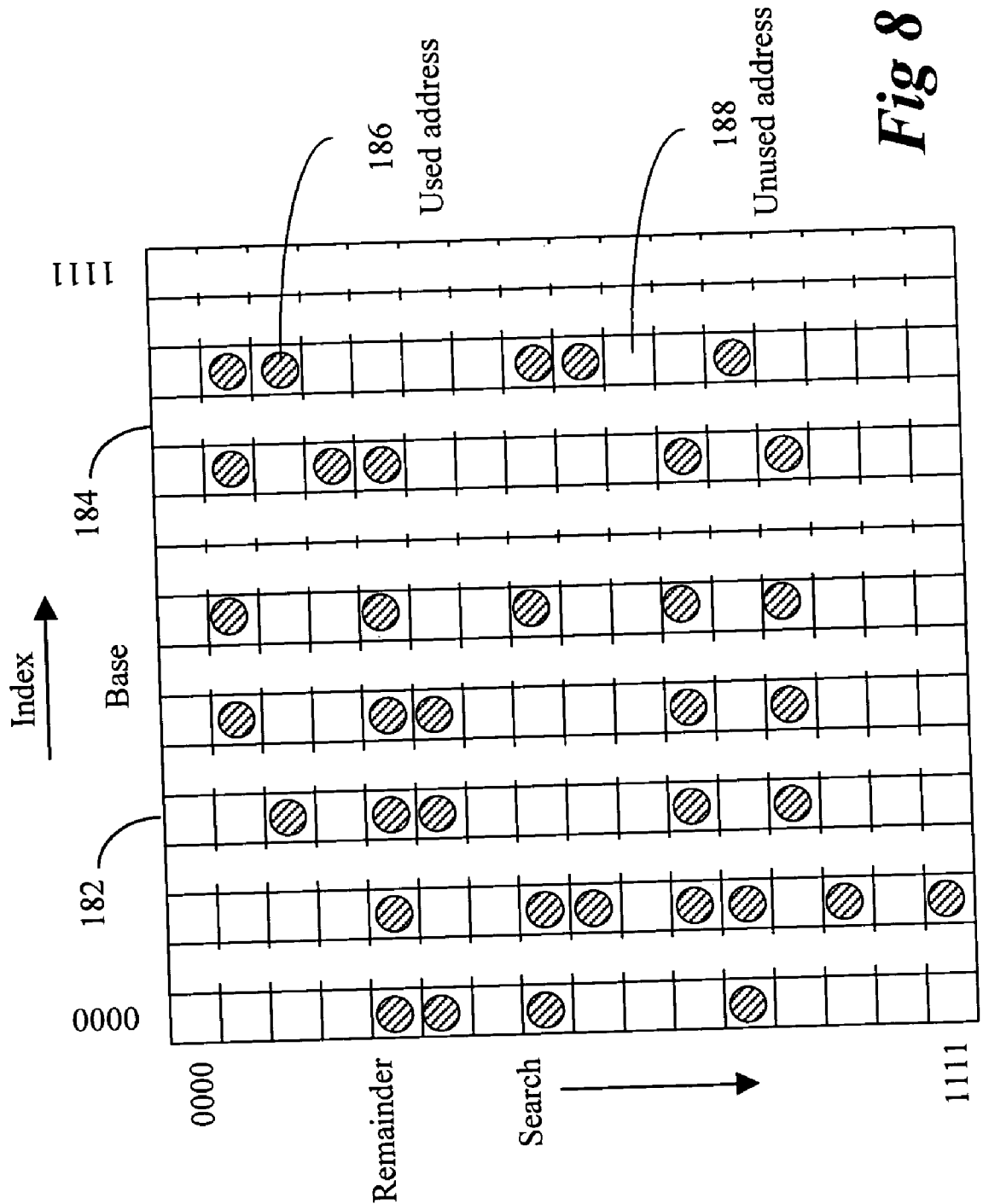

FIGS. 7 and 8 illustrate the basic approach of using an indexing stage followed by a searching stage as depicted in FIG. 5. The figures illustrate a case of a hypothetical 8-bit address, where the addresses are shown in a two-dimensional array. Four bits are used for each dimension. The first four bits (base) identify a column, which is located by an indexing process. In both Figures, a populated column 182 contains at least one address, and a null column 184 does not contain any addresses in use. Addresses in use are shown in dark circles 186 and those not in use are indicated by empty spaces 188. The second four bits (remainder) identify the location of the sought address in an identified populated column 182. If the second stage is also based on indexing, the sought address can be identified directly. As describe earlier, this arrangement would require a large number of memories, each containing one or more columns when the address has a large number of bits, 32 for example. Preferably, the second stage uses a searching procedure in order to reduce the storage requirements. A number of searching units may operate in parallel, so that their combined speed equals or exceeds the speed of a single indexing process implementing the column identification. The indexing-searching method depicted in FIG. 8 is similar to that of FIG. 7 except that a scrambling process is applied to the first four bits in an attempt to equalize the gaps between successive populated columns 182. This process requires that all the first four bits of the address be actually included in the address prefix. This condition is guaranteed by implementing a reconstruction procedure to form a partial-indexing array as indicated in FIG. 9, to be described below.

In the following description, "prefix complementing" refers to the process of generating $2^{(B-L)}$ entries of same translation in indexing memory, L being the length of the indexing segment of an address as will be described with reference to FIG. 11.

FIGS. 9 and 10 show the details of constructing an indexing array, using five digit addresses as examples. The simplest way is to sort the prefixes of the routing table according to the number of bits in each prefix in either an ascending order (FIG. 9) or descending order (FIG. 10). The indexing array is initialized by a void translation (e.g., a code "00" as will be explained later). If an ascending-order sorting is employed, as illustrated in FIG. 9, the prefixes are complemented and the corresponding translation is written in the entries determined from the complemented set, overwriting the current content in the array. The progression is indicated in columns 242, 244, 246, and 248, using sample prefixes in a five-digit address space shown in the Figure. In the process illustrated in FIG. 10, a descending order is employed. The prefixes are complemented and entered in the indexing array only if the entry contains a void translation. The progression is indicated in columns 252, 254, 256, and 258. The procedure can also be implemented without sorting the prefix table, in which case a new entry overwrites a previously written entry only if the new entry has a wider prefix.

In this specification, "addressable entity" is used to indicate an address of a router, gateway, memory, node, etc., to which packets are to be sent for processing, thus requiring translation. It should however be noted that in the Internet environment, the term "prefix" is a more familiar term than addressable entity and thus will be used frequently in this specification.

FIG. 11 shows a partial indexing which uses an arbitrary partitioning of an address 262 of B bits into two segments. A first segment of L bits is followed by a second segment of (B−L) bits. The first segment is hereinafter called a base segment or indexing segment, and the binary tree constructed from the base (indexing) segment is called a base tree. The first (base/indexing) segment of length L is used as a pointer to an entry in an indexing memory and the second segment serves as a search field. The width of the base (indexing) segment of FIG. 11 is chosen so that the all the $2^L$ branching points of the base tree can be stored and directly indexed (directly accessed) in a single memory. With L=16, for example, the required storage would be 65,536 words. The width L of the base segment may be larger than the prefix J (addressable entity) as shown in address 264 in FIG. 12. In this case, indexing requires that the entries of the indexing table corresponding to the remaining (L−J) bits be filled appropriately, as will be described below. FIG. 13, on the other hand, shows an address 266 with a prefix length K greater than L. In such addresses, indexing is performed with the first L bits and the searching process attempts to identify the remaining (K−L) bits of the prefix.

FIG. 14 is a histogram representing a typical prefix-length distribution in the Internet. The prefixes are shown in categories according to their length, and each category is represented by a horizontal bar. In this example, the prefix lengths vary from 8 to 32, with uneven distribution of the number of category prefixes. In the figure, the thickness of a bar at a bit number is representative of the number of addresses in use having the respective bit length. In this example, prefixes which are 8 bit, 16 bit and 24 bit long are more in use than those of other lengths (which is currently the case in the Internet due to historical reasons). As discussed above, the categories of prefixes shorter than or equal to L, L being 16 in this illustration, can be identified by direct indexing only, while the categories of prefix lengths exceeding 16 require a further search process. The base tree contains all the prefix entries in area 282 with length up to L and therefore, prefixes determined within the base tree in the area on the left of the line corresponding to length 16 bits (L=16) can be translated to corresponding addresses by a direct search within the base tree. Each extremity of the base tree can be the root of a new tree, hereafter called a branch. Prefixes contained in area 284 beyond length 16 require further searches involving the branches of the base tree. An extremity can be a valid address with or without a branch stemming from it. It can also be idle not leading to a valid address.

As discussed above, therefore, if all the prefixes in use are shorter than or equal to the base (indexing) segment of an address, i.e., all the prefixes are in the base tree, a search using the base (indexing) segment only is sufficient. Otherwise, searching becomes necessary. Searching is time consuming and the invention provides a solution to circumvent this problem using parallel searching of non-intersecting segments of the prefix directory.

As described earlier, the part of an address following its prefix is known only to a given destination node and is not used within the rest of the network. A direct-access look-up table is constructed, by some artifice or another, to translate every address whose prefix is of a width L or less. Such a look-up table is hereafter called a base table or an indexing table. The base (indexing) table does not provide the translation of an address whose prefix exceeds L. However, it can be used to direct the search process to other devices to provide the translation using the remaining part of the (unknown) prefix of width exceeding L.

Figure 15:
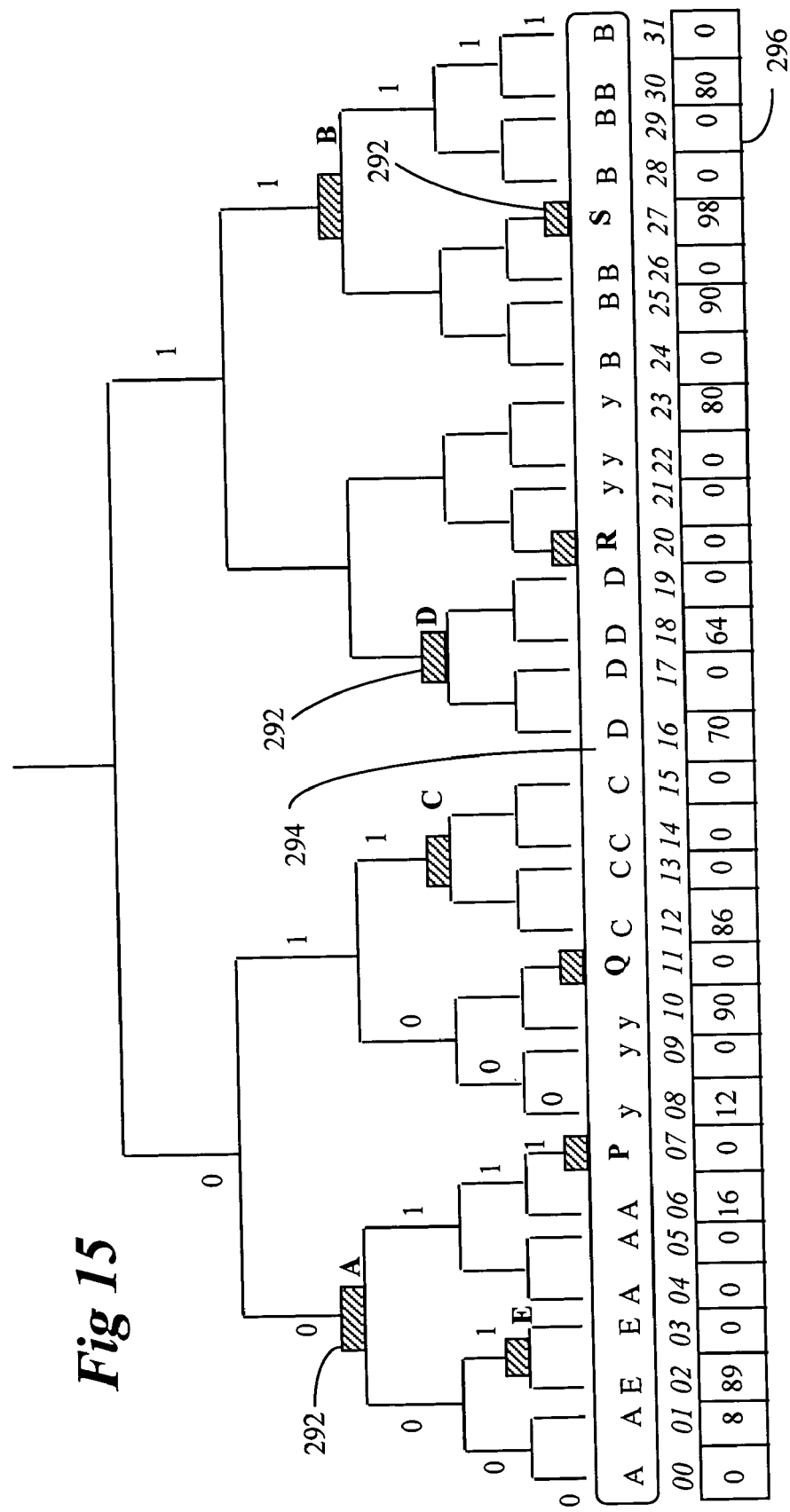
FIG. 15 shows a truncated tree on which a number of prefixes are identified and an array showing the number of prefixes stemming from each extremity of the base tree.

FIG. 15 shows a 5-level tree on which a number of prefixes are identified. The prefixes correspond to addresses A, B, C, D, E, P, Q, R, and S. The prefixes 292 are of different lengths (A:00, B:11, C:011, D:100, E:0001, P:00111, Q:01011, R:10100, S:11011). Each extremity 294 of the base tree is associated with the nearest higher prefix. An extremity 00001 is associated with prefix A while extremity 00010 and 00011 are associated with prefix E. Thus, the extremities can be marked as such and direct indexing, requiring a single memory-access, can be applied. The above example explains the case of a 5-bit indexing segment (L=5). Array 296 at the bottom of FIG. 15 indicates the number of addresses that could not be resolved by direct indexing for each root. For example, at index 01, there are 8 unresolved prefixes, while at index 02 there are 89 unresolved prefixes, at index 23 there are 80 unresolved prefixes, and so on.

Figure 16:
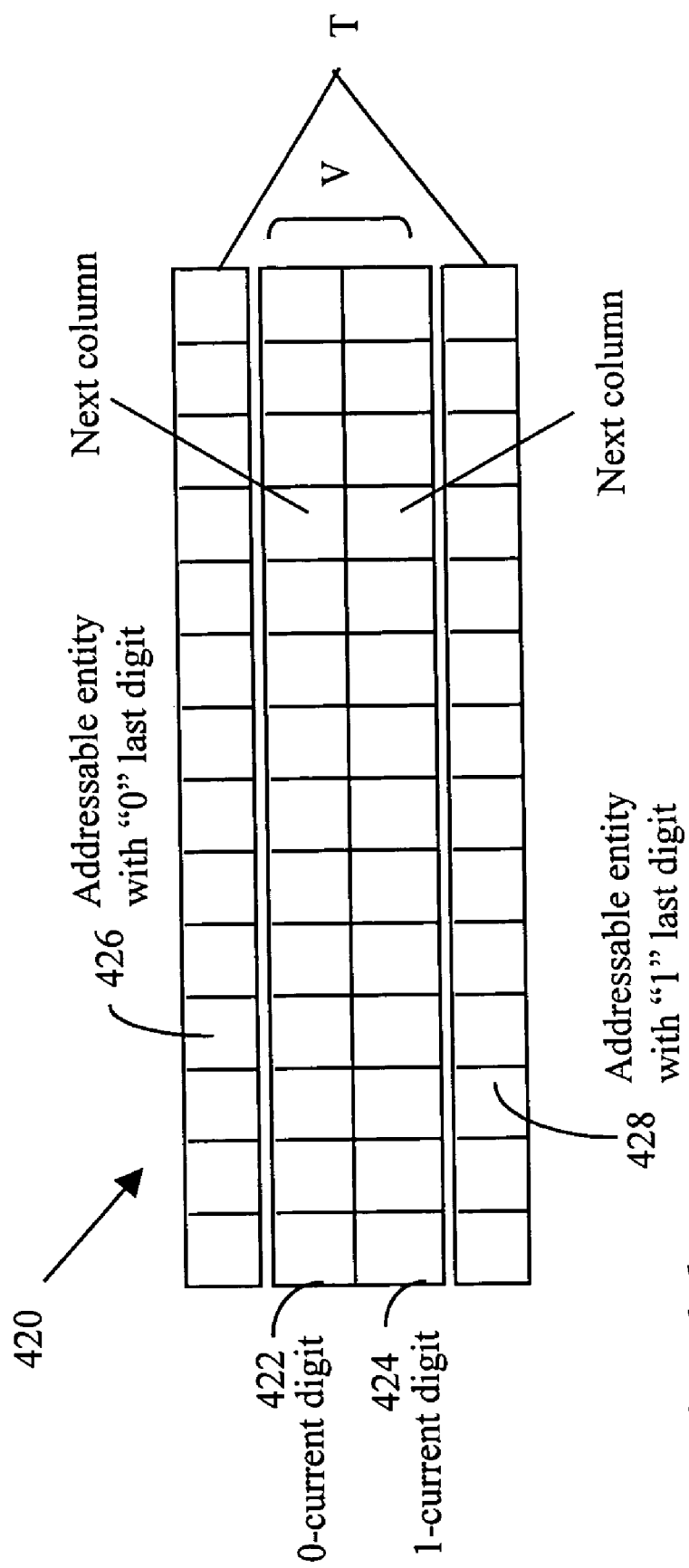
FIG. 16 shows a data structure used for prefix searching in a search unit of FIG. 5.

FIG. 16 shows a data structure used for prefix searching. This searching mechanism can be independently employed for address resolution in certain applications but it can be advantageously used in a search step 152 of FIG. 5.

Referring to FIG. 16, each entry in the structure is initialized as "0". There are 4 rows, 422, 424, 426, and 428, and a number of columns exceeding the number of entries in the prefix table. An entry in row 422 stores a column number to be visited next if the last encountered digit in an address is "0". An entry in row 424 stores a column number to be visited next if the last encountered digit, in an address is "1". An entry in row 426 stores a translation of an address corresponding to an entry in row 422. An entry in row 428 stores a translation of an address corresponding to an entry in row 424. Rows 422 and 424 are treated as two rows of a table V. Similarly, rows 426 and 428 are treated as two rows of a table T. The prefix encoding algorithm and address decoding algorithm described earlier are used to construct tables V and T and to translate an incoming address using the data structure in V an T.

Figure 17:
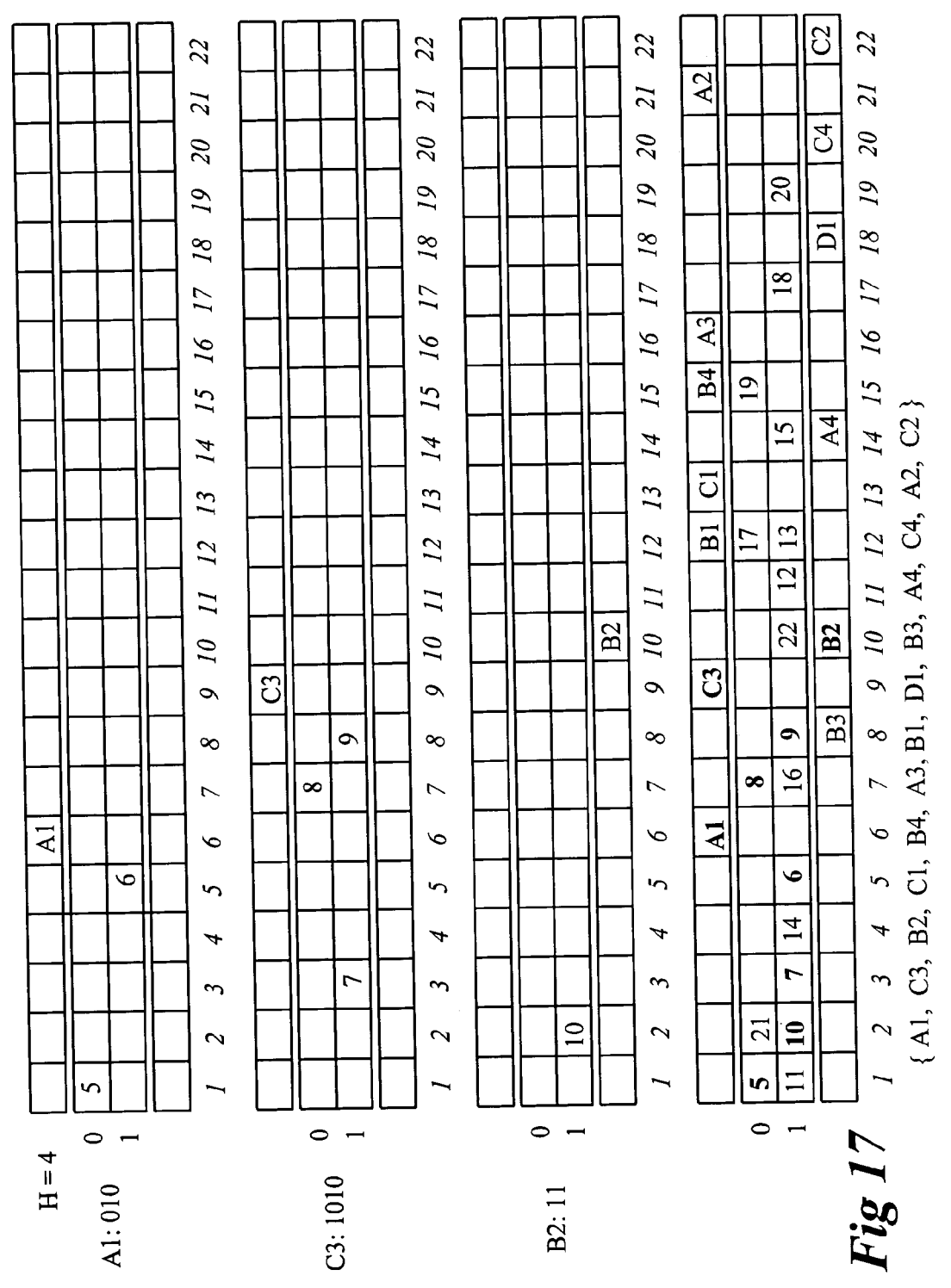

The data structure described above in connection with FIG. 16 can be used for a prefix search involving multiple branches encoded in a single memory. The encoding algorithm described earlier is used for multiple branches sharing a common memory. FIG. 17 illustrates the construction of a second-search memory, focussing on one secondary memory having four interleaved branches (H=4). Using the encoding algorithm described earlier, the four branches:
{A1: 010, B1: 100, C1:110, D 1:11011},
{A2: 00, B2: 11, C2:110},
{A3: 110, B3: 101, C3:1010}, and
{A4: 11, B4: 110, C4:11011}, are encoded as shown in FIG. 17.

In a first step, prefix A1:010 is encoded. The write-pointer K of the selected secondary memory is initialized as K=H=4. A1 belongs to branch 1 (h=1). Increase K by 1 (thus K becomes 5) and since the first digit of A1 is "0", enter the value of K (K=5) in V(0, 1). The second digit of A1 is 1 and it is not the last digit in A1, thus increase K by 1 and in position V(1, 5) write the new value of K (K=6). The last digit of A1 is 0. Thus set T(0, 6)=A1. The value of V(0, 6) must not be overwritten when the last digit of a prefix is encoded.

The next prefix to be encoded is C3 (1010) which belongs to branch 3 (h=3). The write pointer K is increased from K=6 (last value) to K=7 which is entered in V(1, h), i.e. V(1,3), since the first digit of C3 is a "1". The next digit is 0 and V(0, 7) is found to be zero. Thus, K is increased to 8 and V(0, 7)

is set equal to 8. The following digit is 1 and V(1, 8) is found to be zero. Thus, K is increase to 9 and V(1, 8) is set equal to 9. The last digit is "0", hence T(0, 9)=C3. K is not increase for the last digit of an encoded prefix.

The process is continued with the remaining prefixes. The sequence of prefixes shown in FIG. 17 leads to the completed V and T tables shown in the bottom of the figure.

Figure 18:
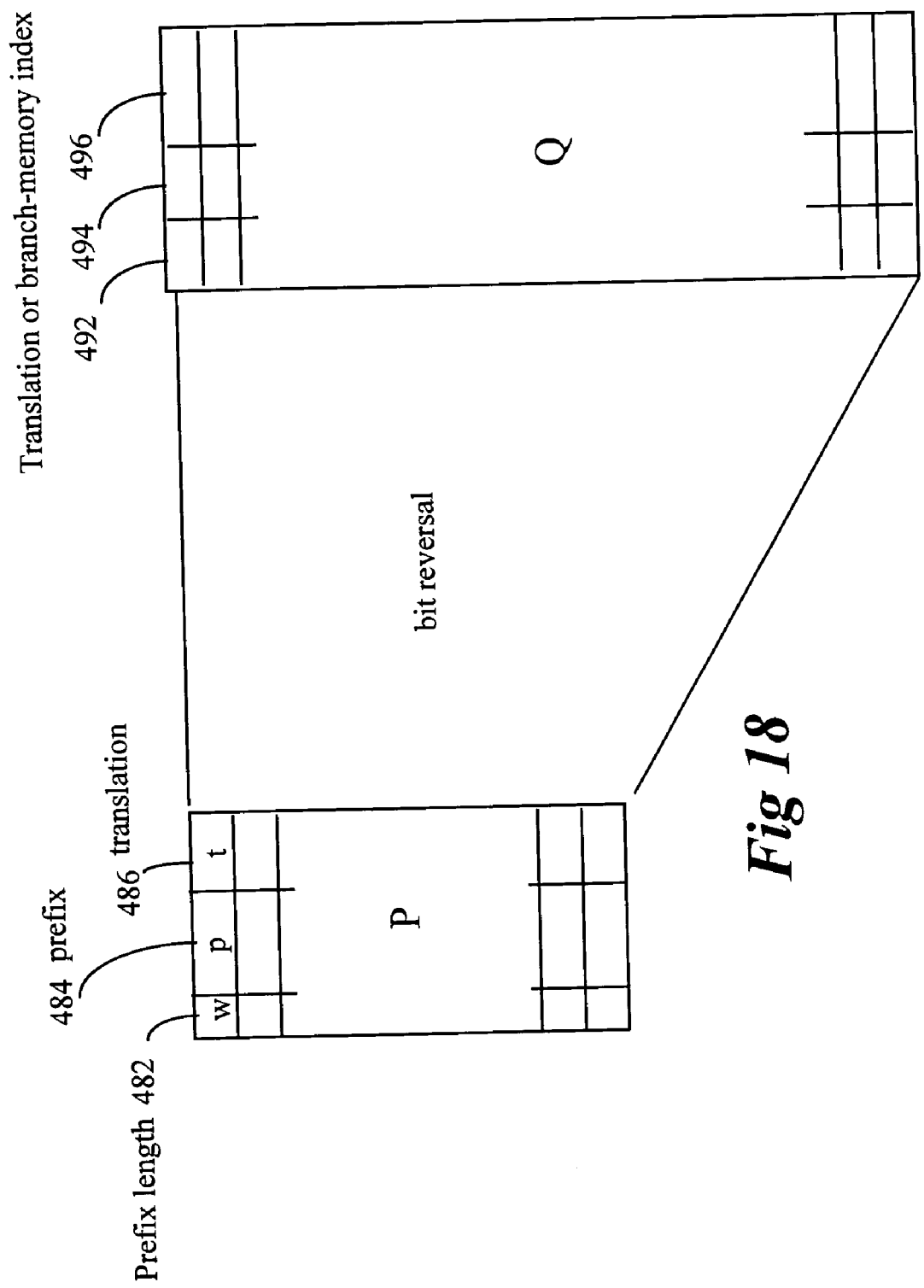
FIG. 18 illustrates the construction of a partial-indexing table Q from a prefix directory P.

FIG. 18 illustrates the construction of a partial-indexing table Q from a prefix directory in connection with one embodiment of the compound indexing-searching technique. The prefixes in the directory are sorted according to their lengths, and placed in a length-sorted table P. The sorted table P has three columns 482, 484, and 486. The number of rows in table P equals the number of available prefixes. Column 482 stores the prefix length of each entry. Column 484 stores the prefix itself. Column 486 stores the translation for each prefix. The length-sorted table P is mapped onto a fixed-length table Q. Table Q has a number of rows equal to $2^L$, L being the length in bits of the partial-indexing field of each address as indicate in FIG. 11. The number of entries in table P is likely to be much smaller than the number of entries in table Q. Table Q has three columns 492, 494, and 496. Each entry in column 492 is initialized as "00". When the process of constructing the indexing table is complete, an entry in column 492, which stores a 2-bit code, will store an entry "00", "01", or "10". An entry "00" indicates that the received address is unknown to the translation mechanism. A "01" indicates that the following field stores a translation. A "10" indicates that the subsequent field stores an identity of a secondary memory and a branch number in the identified secondary memory.

The Data Structure for an Indexing-Search Process

As mentioned earlier, the complement of a prefix of J bits, where J is less than the number L of bits of the indexing segment of an address, is a set of consecutive numbers starting from an L-bit number made up of the number J followed by zeros in the (L–J) least significant positions to an L-bit number made up of the number J followed by ones in (L–J) least significant positions.

Figure 20:
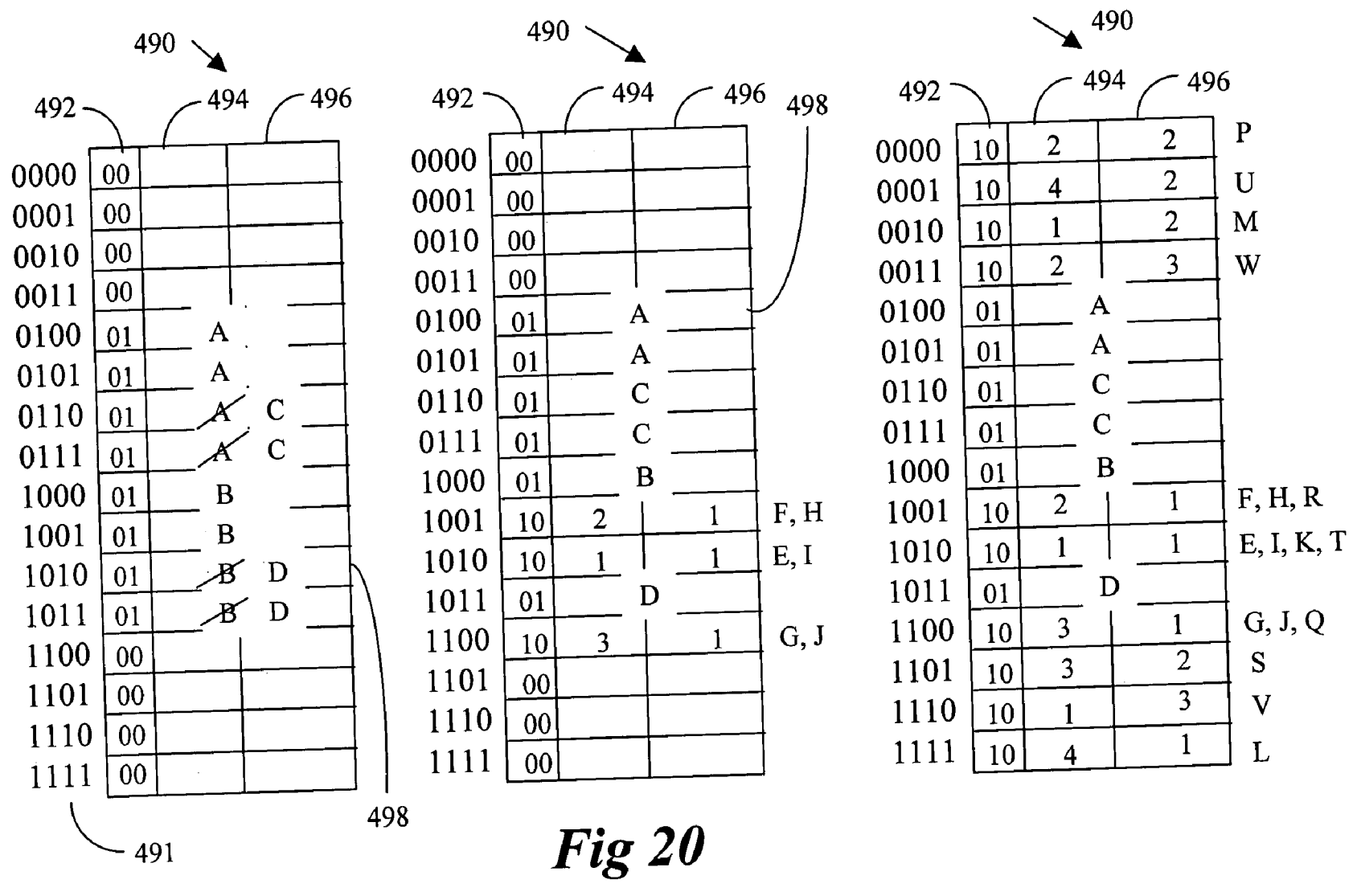

Referring to FIGS. 19 and 20, a prefix table 480 has M rows, M being the number prefixes known to the translation device. Each row has three fields, 482, 484, and 486 containing respectively a prefix length w, a prefix p, and a corresponding translation t of the prefix. Field 482 has a value of w and is $\lceil \log_2 w \rceil$ bits wide, (e.g., 32 bits in IPv4). The notation $\lceil x \rceil$ denotes the nearest higher integer of a real variable x, or the value of x itself if x is an integer. Field 484 is w bits wide, allowing a prefix to be as long as a full address. Field 496 has a sufficient number of bits to represent the highest translation value.

Referring to FIG. 20, sorted indexing table 490 has $2^L$ rows, L being the number of bits in the base (indexing) segment of an address. The value of L is a design parameter. Each row has three fields 492, 494, and 496. Field 492 is a two-bit translation code which is assigned one of three values "00", "01", and "11". For example, as described earlier, these values could have following meanings. The "00" translation code indicates an unknown address. A "01" translation code indicates that the translation "t" follows the translation code in the same row of the indexing memory. A translation code of "10" indicates that the following field in the indexing memory points to one of secondary search memories. The fields 494 and 496 could have different interpretations depending on the translation code in field 492.

In FIG. 20, field 494 has $\lceil \log_2 S \rceil$ bits, where S is the number of secondary search memories which will be shown by designation 546 in FIG. 25 and will be described in detail below. Field 496 has as many bits as required to accommodate the largest number of branches per secondary memory. If, for example, the number of secondary memories is 64, and the maximum number of branches per secondary memory is 4095 (numbered 1 to 4095, branch number 0 is not used), then the number of bits in field 494 is 6 and the width of field 496 is 12 bits. The number of bits in the combined fields 494 and 496 must be sufficient to represent the highest translation value since the combined field may be used for this purpose as will be explained in the procedure of construction the data structures. If the combined field (concatenated fields 494 and 496) has 18 bits, a maximum of about 260000 branches can be encoded in the S secondary memories and the translation has a maximum value of $2^{18}$; 2622144. If the mean number of prefixes per branch is 50, for example, then the mean number of prefixes per secondary memory is about 200,000 and, with S=64, a total of about 12 million prefixes can be encoded.

Building the Indexing Table

Figure 25:
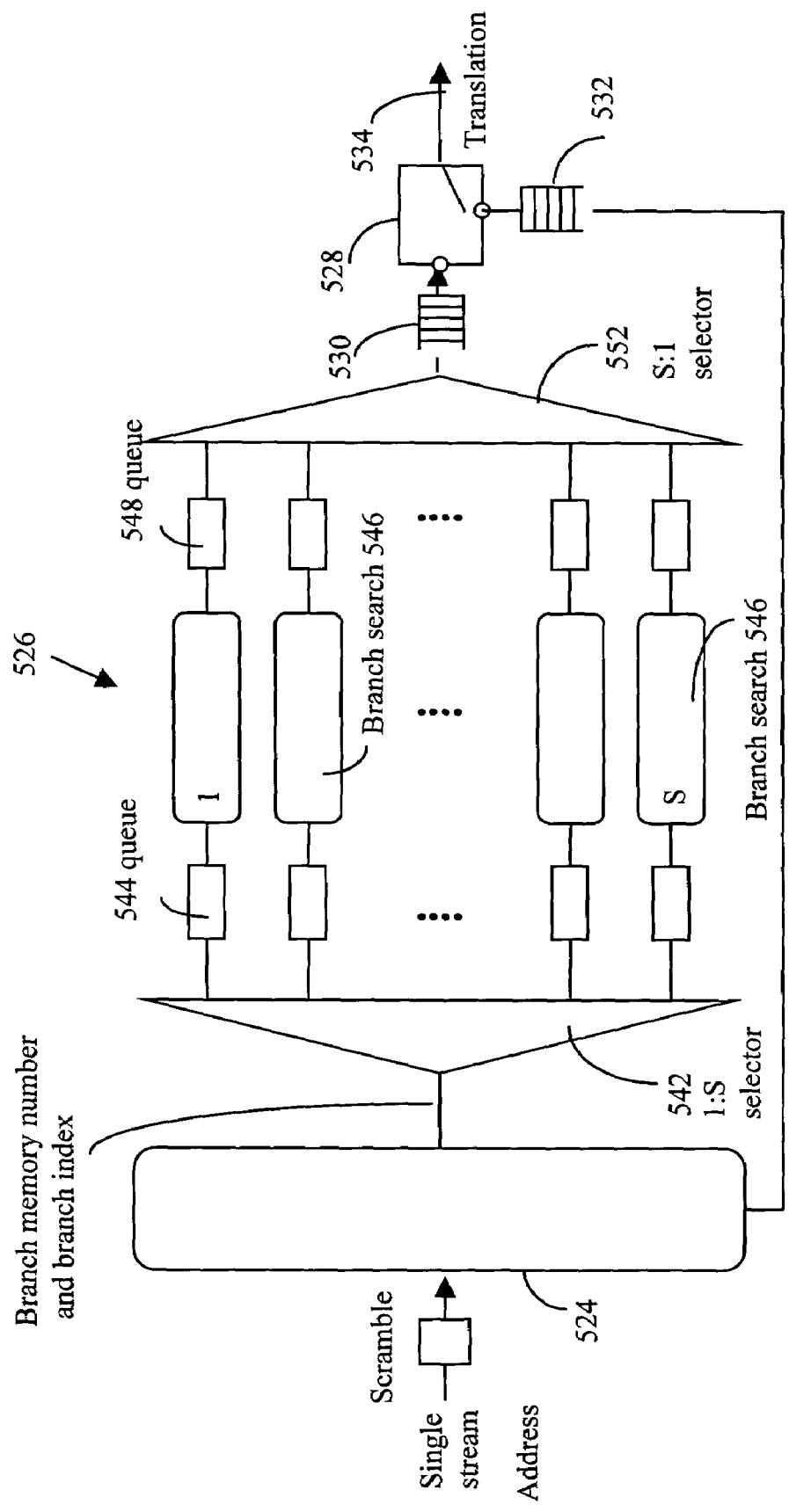
FIG. 25 is a schematic of a translation module showing the construction of a parallel search mechanism (also showing a scrambling circuit).

This process is preferably carried out in software then transferred to the hardware structure of FIGS. 24 and 25 for real-time execution.

A work array $\Omega(.)$ of S entries (not illustrated), S being the highest branch number in each memory is used to store the branch numbers assigned to each secondary memory. $\Omega(m)$ stores a branch number of memory m. Preferably, $0 \leq m \leq 64$ and, $0 < \Omega(m) \leq 4096$. The process is illustrated by an example, using the parameters stated above (2, 6, and 12 bits in fields 492, 494, and 496, respectively). To construct the indexing table and the secondary-search tables stored in the secondary memories, scan rows 0 to (M–1) of prefix table sequentially from prefix directory 480 of FIG. 19. Read prefix width w (field 482), prefix p (field 484), and translation t (field 486). Entries 492, 494 and 496 of FIG. 20 are zero initialized. The first secondary memory is arbitrarily selected to be memory # 1 (m=1). Then the indexing table is built as follows:

if w<L, (a) derive the L-complement set C of prefix p as described earlier.

(b) reverse the binary representation of each element in C in order to effect indexing scrambling.

(c) use the reversed element to index the indexing-table 490 at a respective row 491.

(d) in entry 492 of the respective row 491 write a translation code "01" to overwrite the current value of "00".

(e) the code "01" indicates that a translation is to follow in the combined fields 494–496 (referenced as a single field 498).

(f) the translation "t", read from field 486, is then written in the subsequent 18-bit field 498, overwriting a current value. The use of 18 bits allows a highest translation outcome of about 260000.

if w≥L, (g) the first L bits, preferably L=16, of the prefix are reversed to effect scrambling.

(h) the reversed 16-bit word is used to index the indexing-memory 490 at a respective row 491. In the field 492 of the respective row 491 enter a translation code of "10" to indicate that the translation may be found in a secondary memory.

(i) the identity of the secondary memory is determined by reading field 494 of the respective row 491.

(j) if the read value, denoted m, is greater than 0, then the secondary memory m must be selected. Ω(m) in this case is greater than 0 and the prefix belong to an already-encoded branch.

(k) if the read value is 0, then a secondary memory is selected on a round-robin basis by adding 1 to the identification number of the last-assigned secondary memory. The round-robin selection helps to equalize the number of branches in the secondary memories. This, together with the scrambling process described earlier result in a well-balanced secondary-search stage.

(l) a maximum number of branches per secondary memory may be imposed, in which case a memory that has reached a given threshold is not selected and a subsequent memory is sought.

The procedure is illustrated in FIG. 20 taking the prefix directory shown in FIG. 19 as an example, without the bit-reversal option in order to simplify the illustration. FIG. 19 is a sorted prefix directory containing addresses and their translations A–W. FIG. 20 has three parts showing three phases (i), (ii) and (iii) of the process of building a 4-bits indexing table. The prefix directory is scanned starting from the first row. At phase (i), addresses A and B are entered as translations to corresponding rows and their field 492 is written as "01", indicating that a translation can be found. At phase (ii), addresses C and D are entered to corresponding rows by overwriting if necessary. Address E is 4 bits long (i.e. w≧L) and the corresponding row is written by "10", "1" and "1" in fields 492, 494 and 496 respectively indicating a search being needed in secondary memory #1 starting at location #1 or tree-branch #1. Address F is entered by writing "10", "2" and "1" in fields 492, 494 and 496 indicating a search being needed in secondary memory #2, at its location or tree branch #1. Thus, at phase (ii), continue with following addresses by entering an identity of the secondary memory and the branch number. If the corresponding row has already the secondary memory and branch entered, the existing values are taken. Encoded addresses are indicated by numeral 498.

Once the memory has been selected and the branch number has been determined, the encoding algorithm described earlier is applied to fit the prefix in a respective branch. The construction of the data structure is preferably performed in software and copied to the indexing table and secondary-search memories illustrated in FIG. 25, for real-time processing. (A branch prefix is the part of a prefix following the first L bits, L being the width of the indexing segment of an address.)

Figure 21:
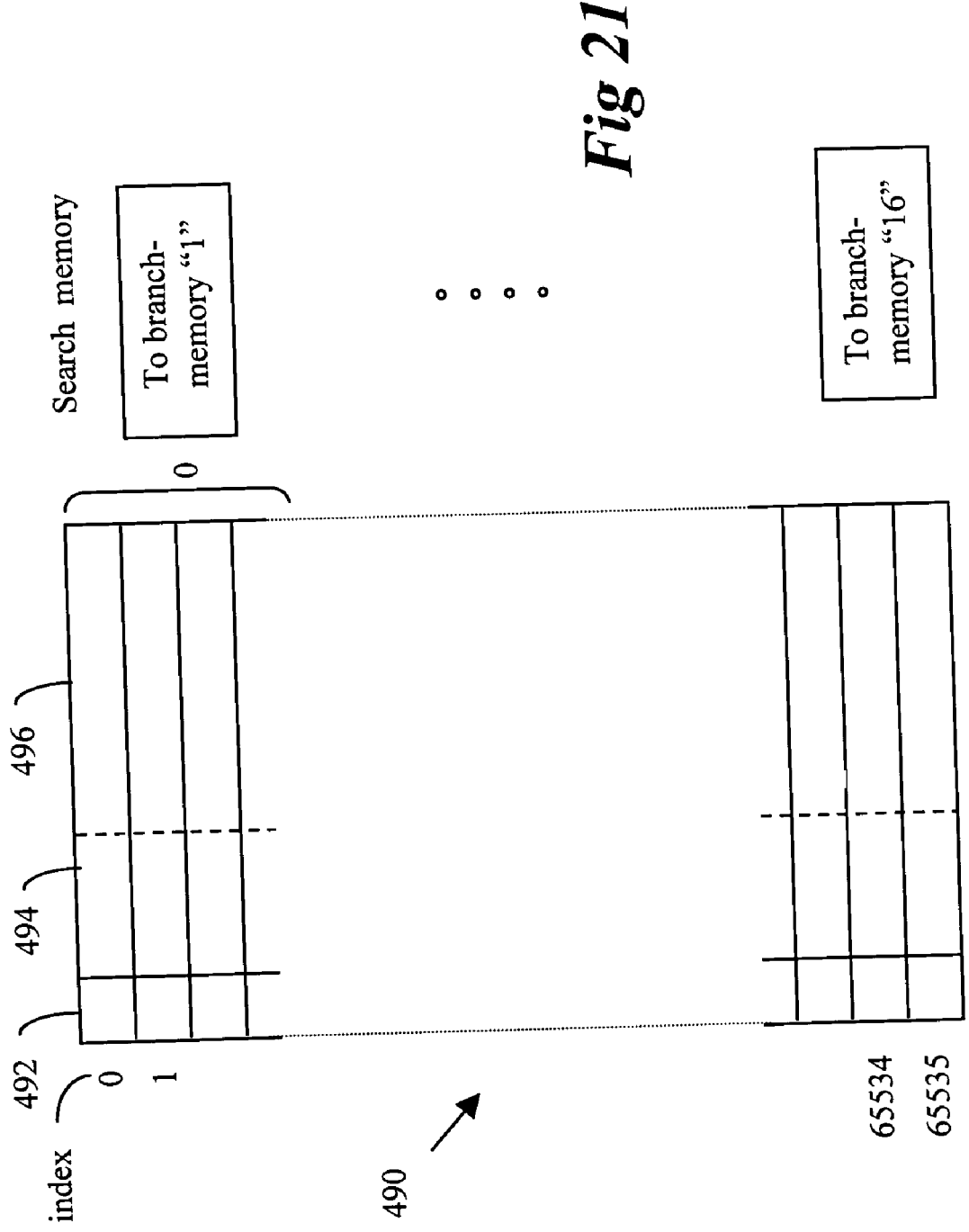
FIG. 21 is a conceptual view of the indexing-searching mechanism.

FIG. 21 is a conceptual view of the indexing-searching mechanism. The figure is based on a partial index L of 16 bits, leading to a partial-indexing table 490 of 65536 entries. Each entry comprises three fields as described earlier. The first field 492 is a 2-bit translation code. The second field 494 is a secondary-memory identifier, and the third field 496 is a tree-branch number in the identified secondary memory in column 494 as determined during the construction process. The example shows 16 search units, each storing interleaved branches of data structures 420 (FIGS. 16 and 17).

Figure 22:
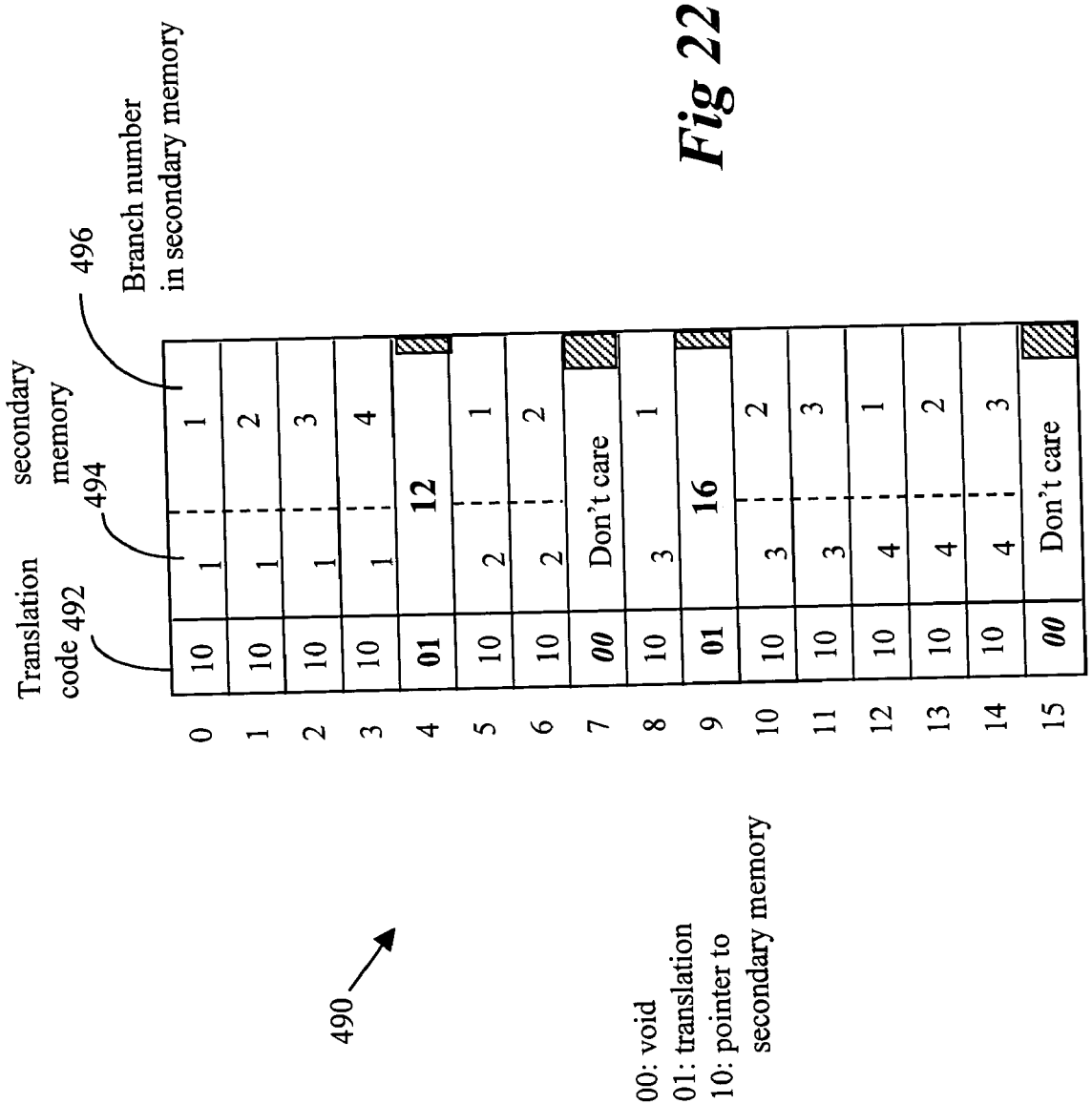
FIG. 22 illustrates the content of an indexing table using a simplified case of 16 prefixes.

FIG. 22 illustrates the content of table 490 of FIG. 21 using a simplified case of 16 entries (L=4). Row 0 in the table shows a translation code "10'. It directs the search to search unit "1" to search a tree starting in location "1". Row 1 also has a translation code of "10" and directs the search to a secondary search unit "1" but searching a branch starting at location "2". The search tree process can be shifted as shown in the algorithm provided earlier. Row number 4 shows that the translation is complete (the result being 12) since the translation code is "01". Row number 7 has an unproductive translation since the translation code is "00".

Figure 23:
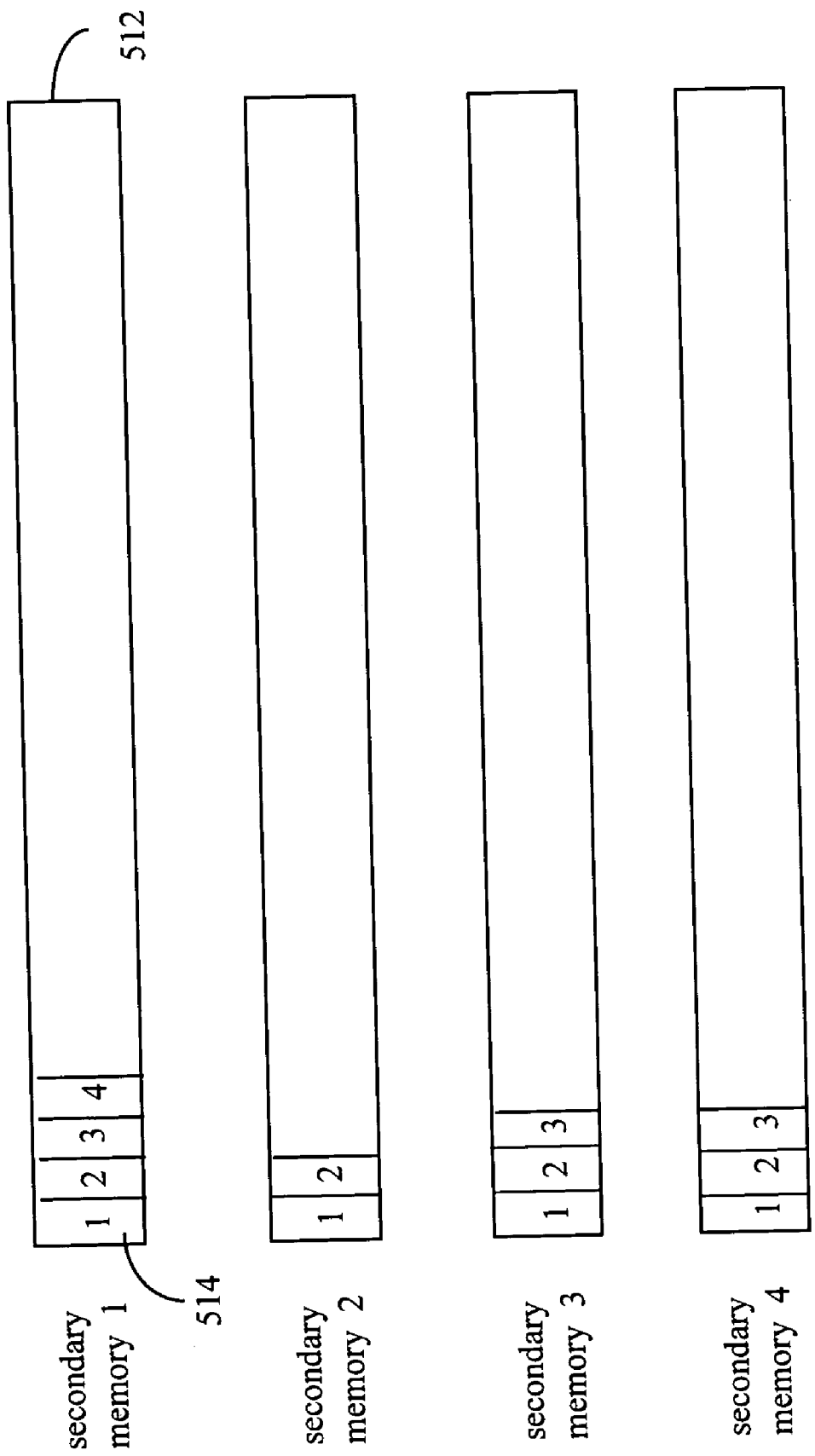
FIG. 23 illustrates the initialization of a multi-branch secondary search memory where the branches are encoded in an interleave fashion to reduce the number of secondary memories and to pack the entries in each of the parallel memories.

FIG. 23 illustrates the four search memories associated with the example of FIG. 22. Each search memory stores interleaved branches, having an interleaved data structure 420 of FIG. 16. The top memory 512 has four encoded branches, the second memory has two encoded branches, etc. An entry 514 is the root of a respective branch having the same branch number as the position of the entry (relative to a memory index offset, if any).

FIG. 24 is a schematic of an indexing-searching mechanism 520 of a relatively large directory. The final output of the mechanism is either a valid translation or a void indication that the prefix of the address is not provided in the prefix table. The addresses to be translated are aggregated in a single stream 522 and offered to the indexing unit 524. Optional scramble unit 523 can be provided here. The output of the indexing unit is either a void "00" a translation "01", or a request to start a search process "10". If the output is a translation, it is directed through a link and queue 532 towards the respective ingress port. If the output is a search request, it constitutes a search memory identifier and a pointer to a location in the indicated search memory. The output of parallel searching 526 using the search memory is either a valid translation or a code indicating that the prefix of the address is not contained in the original routing table. A holding buffer 530 holds the translation output of the parallel-search unit 526. If indexing yields a translation, a holding buffer 532 holds the result of indexing. A selector 528 connects either of the translation results held in buffers 530 or 532 to output 534. The buffers 530 or 532 are short, each holding a small number of translation results at a time which is transmitted at 534 to the ingress requesting a translation.

FIG. 25 is a schematic of a translation module 520 showing the construction of the parallel search mechanism 526 shown in FIG. 24. Same numerals are used to show same elements in the both Figures. The output of the indexing unit 524 is distributed using the 1 to S selector 542 which distributes the (B−L) bits of the unresolved address to a corresponding secondary search memory. The branch search memory number is indicated in the indexing table of the indexing unit 524. The output of the 1:S selector 542 is buffered in a queue 544 of a respective branch search units 546. The buffer queues 548 are needed since the indexing unit 524 can output addresses at a much higher speed than the speed of resolution in any of the units 546. The combined translation capacity of the search units 546 is preferably higher than the capacity of the indexing unit 524. However, buffering at queue 544 and at queue 548 may still be needed since the loading of the different units 546 may not be uniform and generally fluctuates with time. An S:1 selector 552 multiplexes the translations into a single stream.

What is claimed is:

1. A method of resolving B bit long addresses of packets into prefixes of any length up to B by a use of a data structure, wherein the data structure comprises a length sorted table Q and a plurality of secondary search units, table Q containing data related to prefixes of length not exceeding A, A≦B and each secondary search unit including tables V and T, wherein tables V and T are in one-to-one correspondence to one another and each comprising a 2×M memory, M being a positive integer, the method comprising steps of:

(1) indexing table Q by using first A bits of an address to generate a corresponding prefix of length equal to or less than A, or a pointer to a secondary search unit;

(2) accessing table V of the secondary search unit indicated by the pointer using each successive remaining bit of the address in order;

(3) accessing table T of the secondary search unit at each successive location corresponding to a location of table V accessed in step (2); and (4) reading a valid data contained at a location in table T, the valid data being a prefix of length more than A, wherein steps (2)–(4) are performed for at least two of said addresses in at least two of the secondary search units in parallel, and wherein each secondary unit comprises one or more search branches and a pointer to a secondary search unit indicates an identity of the secondary unit and a branch number h, data relating to two or more search branches are interleaved in tables V and T of a secondary unit, and the method further comprises a step of accessing table V at a location indicated by the branch number h of the secondary unit identified by the pointer.

2. The method according to claim 1, wherein the step of accessing table V in each identified secondary search unit comprises further steps of:

(5) accessing table V by using a first bit of the remaining bits of the address at a location identified by branch number h;

(6) reading table V at a location indicating a next location of table V;

(7) continue accessing and reading each successive location using each successive bit of the remaining bits until the Bth bit; and (8) continue reading the valid data contained at a location in table T corresponding to successive locations read in the step (7).

3. The method according to claim 2, comprising further steps of:

accessing table T at a location corresponding to each successive location accessed in steps (5)–(7);

recording data contained at each accessed location of table T; and reading the valid data contained at the latest previously accessed location if last accessed locations contained no valid data.

4. The method according to claim 3, wherein $u_j$ is $j^{th}$ bit of a B-bit received address, and the B-bit received address is known to belong to branch h, the steps of accessing and reading table V and T in each secondary search unit are performed as follows to generate a prefix t:

```
y=h, t=0
for 1≤d≤B
{       x=u_d;
    if (T(x, y)>0) t=T(x, y));
    y=V(x, y)
    if V(x, y)>0, y=V(x, y)
};
``` where y is an address-branch index and x is a bit-position in said B-bit received address.

5. The method according to claim 4, wherein the step of reading the valid data contained at the location in table T is replaced by steps of:

reading an indicator contained at the location in table T;

accessing a storage device at a location indicated by the indicator; and reading the valid data contained at the location indicated by the indicator in the storage device.

6. The method according to claim 5, further comprising a step of:

scrambling all bits of the addresses to be translated according to a reproducible formula.

7. The method according to claim 6, wherein the reproducible formula is a bit reversal of all the bits in the addresses.

8. The method according to claim 1, wherein length sorted table Q provides an indication of '00' if an address cannot be resolved, "01" if a prefix is found, and "10", if a further search is required in a respective secondary search unit, wherein a "10" outcome is associated with a branch number.

9. An apparatus for address translation of a packet, comprising:

a parsing block for receiving the packet and parsing an address of the packet, the address having length B, B being a positive integer;

an indexing block for directly accessing a sorted prefix directory by first A binary bits, A<B, the sorted prefix directory containing translated prefixes of length not exceeding A and data specifying one of a plurality of secondary search units;

the plurality of secondary search units each having a secondary memory for searching in parallel for different prefixes of length greater than A; and a scrambling unit for scrambling the first A bits of the address to be translated according to a reproducible formula, wherein each secondary memory comprises tables V and T containing interleaved tree branches, each of said tree branches corresponding to an entry in said sorted prefix directory, and wherein each prefix of length longer than A belongs to a specific branch and each secondary memory contains prefixes of at least one branch.

10. The apparatus according to claim 9 wherein the reproducible formula is a bit reversal of the first A bits in the address.

11. An address translation apparatus for telecommunications networks, wherein packets are transported to addresses contained therein, comprising:

an address separation unit for separating from a packet an address to be translated;

primary translation unit having a primary translation table for translating the address to a prefix, the primary translation table containing prefixes, wherein widths of the prefixes are less than a predetermined value and locations of branch search data structures in secondary search units;

a plurality of secondary search units for performing secondary searches in parallel, each secondary search unit having a secondary memory storing a branch search data structure for performing each secondary search and translating the address to a prefix, if the primary translation table indicates a location of a branch search data structure to begin a secondary search; and an address scrambling unit for scrambling the address according to a predetermined reproducible formula.

12. The address translation apparatus for telecommunications networks according to claim 11 further comprising:

a selector for selecting a secondary search unit for performing the secondary search.

13. The address translation apparatus according to claim 11 wherein said secondary searches are concurrently performed for a number of distinct addresses not exceeding a number of secondary search units in said plurality of secondary search units.

14. A method of translating addresses each comprising a prefix and a remaining part, said prefix having a respective unknown number of bits, the method comprising steps of:
- defining an indexing part comprising a predetermined number of bits;
- indexing a first memory device containing an indexing table based upon said indexing part;
- determining from said indexing a translation code, a first pointer, and a second pointer;
- said translation code is a first predetermined value or a second predetermined value; and
- if said translation code equals the first predetermined value,
- accessing a secondary memory device from among a plurality of secondary memory devices, said secondary memory device corresponding to said first pointer and storing a plurality of prefixes encoded in at least one tree structure;
- performing a tree-search process on one of said at least one tree structure having a root defined by said second pointer, wherein said tree-search process identifies the prefix; and
- equating the prefix to a word comprising concatenation of said first pointer and said second pointer if said translation code comprises the second predetermined value.

15. The method of claim 14 wherein said steps of indexing, determining, and accessing are executed in a sequential temporal order.

16. The method of claim 15 wherein said tree-search process for one of said addresses is performed concurrently with said tree-search process for at least one other of said addresses in at least two of said secondary memory devices.

17. A method of translating addresses each comprising a prefix and a remaining part, said prefix having a respective unknown number of bits, the method comprising steps of:
- defining an indexing part comprising a predetermined number of bits;
- indexing a first memory device containing an indexing table based upon said indexing part;
- determining from said indexing a translation code, a first pointer, and a second pointer, wherein said translation code equals a predetermined value;
- accessing a secondary memory device from among a plurality of secondary memory devices, said secondary memory device corresponding to said first pointer and storing a plurality of prefixes encoded in at least one tree structure; and
- performing a tree-search process on one of said at least one tree structure having a root defined by said second pointer, wherein said tree-search process identifies the prefix,
- wherein said steps of indexing, determining, and accessing are executed in a sequential temporal order and said tree-search process for one of said addresses is performed concurrently with said tree-search process for at least one other of said addresses in at least two of said secondary memory devices, and
- buffering said second pointer at said secondary memory device if said secondary memory device is in use in said tree-search process for another one of said addresses.

18. A method of resolving addresses comprising steps of:
- receiving a multiplicity of addresses, each address including a first prefix of unknown length;
- indexing, using a fixed part of said each address, an indexing table Q, to read a translation code and data record;
- said translation code is a first predetermined value, a second predetermined value, or a third predetermined value;
- resolving said data record as a translation if said translation code equals the first predetermined value;
- resolving said data record to two identifiers if said translation code equals the second predetermined value, a first of said two identifiers indicating a target secondary search unit in a plurality of secondary search units and a second of said two identifiers indicating a location in said target secondary search unit, wherein the location corresponds to a root of a branch, said branch comprising prefixes having in common said fixed part of said each address; and
- resolving said each address as unknown if said translation code equals the third predetermined value,
- wherein said each address, excluding said fixed part of said each address, is further processed by said target secondary search unit to resolve said each address to a translation, wherein at least two of said secondary search units concurrently process at least two addresses in said multiplicity of addresses, and wherein at least one of said addresses in said multiplicity of addresses is queued in a buffer associated with said target secondary unit.

19. The method of claim 18 wherein said first predetermined value is '01', said second predetermined value is '10', and said third predetermined value is '00'.

* * * * *